United States Patent
Leizerovich et al.

(10) Patent No.: US 12,022,592 B2
(45) Date of Patent: *Jun. 25, 2024

(54) APPARATUS AND METHOD FOR PROVIDING POWER AT A STREETLIGHT

(71) Applicant: UBICQUIA, INC., Fort Lauderdale, FL (US)

(72) Inventors: Gustavo Dario Leizerovich, Aventura, FL (US); Ian B. Aaron, Fort Lauderdale, FL (US); Charles M. Nobles, Raleigh, NC (US)

(73) Assignee: Ubicquia, Inc., Fort Lauderdale, FL (US)

( * ) Notice: Subject to any disclaimer, the term of this patent is extended or adjusted under 35 U.S.C. 154(b) by 428 days.

This patent is subject to a terminal disclaimer.

(21) Appl. No.: 17/394,605

(22) Filed: Aug. 5, 2021

(65) Prior Publication Data

US 2022/0167487 A1 May 26, 2022

Related U.S. Application Data

(63) Continuation of application No. 17/102,354, filed on Nov. 23, 2020, now Pat. No. 11,116,062.

(51) Int. Cl.
*H05B 47/18* (2020.01)
*F21S 8/08* (2006.01)
(Continued)

(52) U.S. Cl.
CPC ............. *H05B 47/18* (2020.01); *F21S 8/086* (2013.01); *G05B 15/02* (2013.01); *G06F 1/28* (2013.01);
(Continued)

(58) Field of Classification Search
None
See application file for complete search history.

(56) References Cited

U.S. PATENT DOCUMENTS 3,035,802 A 5/1962 Wyman et al.
4,731,551 A 3/1988 Gibbs et al.
(Continued)

FOREIGN PATENT DOCUMENTS

KR 201009556 U 9/2010
WO 2013026008 A2 2/2013
(Continued)

OTHER PUBLICATIONS

5G PPP Architecture Working Group, "View on 5G Architecture," Version 1.0, Jul. 2016, 61 pages.
(Continued)

*Primary Examiner* — Wilson Lee
(74) *Attorney, Agent, or Firm* — Daniel C. Crilly

(57) ABSTRACT

An apparatus connectable to a streetlight luminaire includes a housing, an electrical connector, power conversion circuitry, and an output power interface. The housing has a top surface, a bottom surface, and at least one sidewall interconnecting the top and bottom surfaces. The electrical connector is integrated with the bottom surface of the housing and electromechanically connectable to a top-side electrical connector of the streetlight luminaire. The power conversion circuitry is operable to receive an input alternating current (AC) signal from the electrical connector and produce at least one output AC signal, wherein an average voltage of each output AC signal is less than an average voltage of the input AC signal. The output power interface is electrically coupled to the power conversion circuitry and integrated with the sidewall(s) of the housing. The output power interface is arranged to provide the output AC signal(s) for use external to the housing.

22 Claims, 9 Drawing Sheets

(51) Int. Cl.

| | | |
|---|---|---|
| *G05B 15/02* | (2006.01) | |
| *G06F 1/28* | (2006.01) | |
| *G06F 1/3296* | (2019.01) | |
| *G06Q 50/06* | (2012.01) | |
| *G06Q 50/26* | (2012.01) | |
| *H01R 33/945* | (2006.01) | |
| *H05B 47/11* | (2020.01) | |

(52) U.S. Cl.
CPC .......... *G06F 1/3296* (2013.01); *G06Q 50/06* (2013.01); *G06Q 50/26* (2013.01); *H01R 33/945* (2013.01); *H05B 47/11* (2020.01)

(56) References Cited

U.S. PATENT DOCUMENTS

| | | | |
|---|---|---|---|
| 6,366,379 | B1 | 4/2002 | Terahara et al. |
| 7,333,903 | B2 | 2/2008 | Walters et al. |
| 7,623,858 | B2 | 11/2009 | Johnston, Jr. |
| 7,723,862 | B1 | 5/2010 | Spillman et al. |
| 7,825,793 | B1 | 11/2010 | Spillman et al. |
| 8,290,710 | B2 | 10/2012 | Cleland et al. |
| 8,442,785 | B2 | 5/2013 | Walters et al. |
| 8,445,826 | B2 | 5/2013 | Verfuerth |
| 8,558,413 | B1 | 10/2013 | Lepard |
| 8,820,952 | B2 | 9/2014 | Agrawal |
| 8,864,514 | B2 | 10/2014 | Ilyes |
| 9,924,582 | B2 | 3/2018 | Vendetti et al. |
| 10,094,546 | B2 | 10/2018 | Agrawal et al. |
| 10,112,712 | B1 | 10/2018 | Gentry et al. |
| 10,238,001 | B2 | 3/2019 | Agrawal et al. |
| 10,314,147 | B2 | 6/2019 | Agrawal |
| 10,390,112 | B1 | 8/2019 | Binggeli et al. |
| 2002/0135315 | A1 | 9/2002 | Pulco, Sr. et al. |
| 2007/0013513 | A1 | 1/2007 | Tang et al. |
| 2007/0037516 | A1 | 2/2007 | Sawai et al. |
| 2007/0258202 | A1 | 11/2007 | Cooley et al. |
| 2008/0175216 | A1 | 7/2008 | Nasco |
| 2009/0066258 | A1 | 3/2009 | Cleland et al. |
| 2009/0085487 | A1 | 4/2009 | Braasch |
| 2009/0222223 | A1 | 9/2009 | Walters et al. |
| 2010/0271178 | A1 | 10/2010 | Ahmad |
| 2011/0062888 | A1 | 3/2011 | Bondy et al. |
| 2011/0223783 | A1 | 9/2011 | Pearson et al. |
| 2011/0241559 | A1 | 10/2011 | Grajcar |
| 2012/0038490 | A1 | 2/2012 | Verfuerth |
| 2012/0074641 | A1 | 3/2012 | Murata |
| 2012/0139426 | A1 | 6/2012 | Ilyes et al. |
| 2012/0179396 | A1 | 7/2012 | Hanley |
| 2013/0015707 | A1 | 1/2013 | Redmann |
| 2013/0040471 | A1 | 2/2013 | Gervais et al. |
| 2013/0044488 | A1 | 2/2013 | Hreish |
| 2013/0064136 | A1 | 3/2013 | Apostolakis |
| 2013/0181609 | A1 | 7/2013 | Agrawal |
| 2013/0181614 | A1 | 7/2013 | Agrawal |
| 2013/0181636 | A1 | 7/2013 | Agrawal |
| 2013/0200813 | A1 | 8/2013 | Wang et al. |
| 2013/0214697 | A1* | 8/2013 | Archenhold ........... H05B 47/18 315/291 |
| 2014/0036473 | A1 | 2/2014 | Agrawal |
| 2014/0050483 | A1 | 2/2014 | Berlin et al. |
| 2014/0197745 | A1 | 7/2014 | Agrawal |
| 2014/0198216 | A1 | 7/2014 | Zhai et al. |
| 2015/0032743 | A1 | 1/2015 | Agrawal |
| 2015/0124100 | A1 | 5/2015 | McRory |
| 2015/0137703 | A1 | 5/2015 | Hartman et al. |
| 2015/0173159 | A1 | 6/2015 | Lin et al. |
| 2016/0126629 | A1 | 5/2016 | Cherette et al. |
| 2016/0234900 | A1* | 8/2016 | Bendtsen ............... H05B 45/12 |
| 2016/0352142 | A1 | 12/2016 | Hughes |
| 2017/0013698 | A1 | 1/2017 | Agrawal |
| 2017/0045213 | A1 | 2/2017 | Williams et al. |
| 2017/0301220 | A1 | 10/2017 | Jarrell et al. |
| 2017/0311424 | A1 | 10/2017 | Vendetti et al. |
| 2017/0336061 | A1 | 11/2017 | Riedel et al. |
| 2018/0045388 | A1 | 2/2018 | McDowell et al. |
| 2018/0077523 | A1 | 3/2018 | Herrera |
| 2018/0115751 | A1 | 4/2018 | Noone |
| 2018/0213671 | A1 | 7/2018 | Riedel et al. |
| 2018/0255622 | A1* | 9/2018 | Spero .................... B60Q 1/085 |
| 2018/0288860 | A1 | 10/2018 | Vendetti et al. |
| 2018/0372376 | A1 | 12/2018 | Cartmill et al. |
| 2019/0208660 | A1 | 7/2019 | Agrawal et al. |
| 2019/0313516 | A1 | 10/2019 | Cartmill et al. |
| 2019/0337449 | A1* | 11/2019 | Diana ..................... H05K 1/189 |
| 2019/0341732 | A1* | 11/2019 | Aaron ................ H04B 10/2575 |
| 2019/0381904 | A1 | 12/2019 | Lowenthal et al. |

FOREIGN PATENT DOCUMENTS

| | | |
|---|---|---|
| WO | 2017184636 A1 | 10/2017 |
| WO | 2017200627 A1 | 11/2017 |
| WO | 2017210791 A1 | 12/2017 |
| WO | 2019136480 A2 | 7/2019 |
| WO | 2019136482 A1 | 7/2019 |

OTHER PUBLICATIONS

American National Standards Institute, Inc., "American National Standard for Roadway and Area Lighting Equipment—Dimming Control Between an External Locking Type Photocontrol and Ballast or Driver," ANSI C136.41-2013, National Electrical Manufacturers Association, Jan. 29, 2014, 7 pages.
ANSI C136.41 Dimming Receptacle, TE Connectivity, 2014, 2 pages.
Cisco Systems, Inc., "Cisco Smart+Connected City Multi-Sensor Core Node (External)," Data Sheet, 2015, 6 pages.
Dack, "Smart Street Light Metering—Apr. 2017," Radian Research, 2017, 7 pages.
"Huawei Connected City Lighting Solution," Huawei Technologies Co., Ltd., 2015, 8 pages.
International Search Report and Written Opinion for International Patent Application No. PCT/US2019/012777, Mar. 22, 2019, 7 pages.
"LUMEWAVE: Wireless Outdoor Lighting Controller (TOP900 Series)," Echelon, DS-16001 rev Aug. 2001, 2 pages.
"Red Hat Openstack Platform: Modernize with a Virtualized Radio Access Network from Red Hat and Altiostar," Partner Solution Brief, Red Hat, Inc. & Altiostar, 2018, 2 pages.
U.S. Patent & Trademark Office, International Search Report issued in connection with counterpart International Application No. PCT/US21/60381, Feb. 8, 2022, 2 pages.
U.S. Patent & Trademark Office, Written Opinion of the International Searching Authority issued in connection with counterpart International Application No. PCT/US21/60381, Feb. 8, 2022, 11 pages.

* cited by examiner

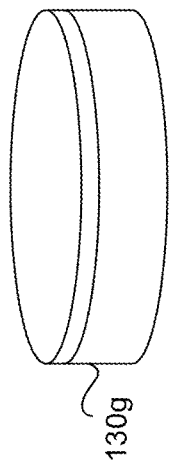
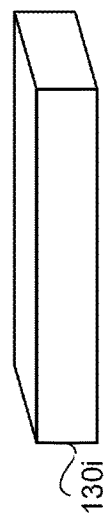
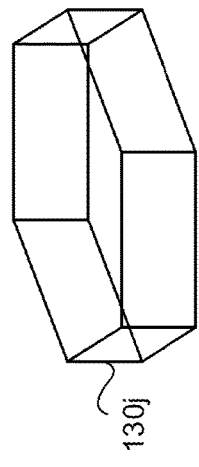
*Fig. 8B*
*Fig. 8C*
*Fig. 8D*
*Fig. 8E*
*Fig. 8F*
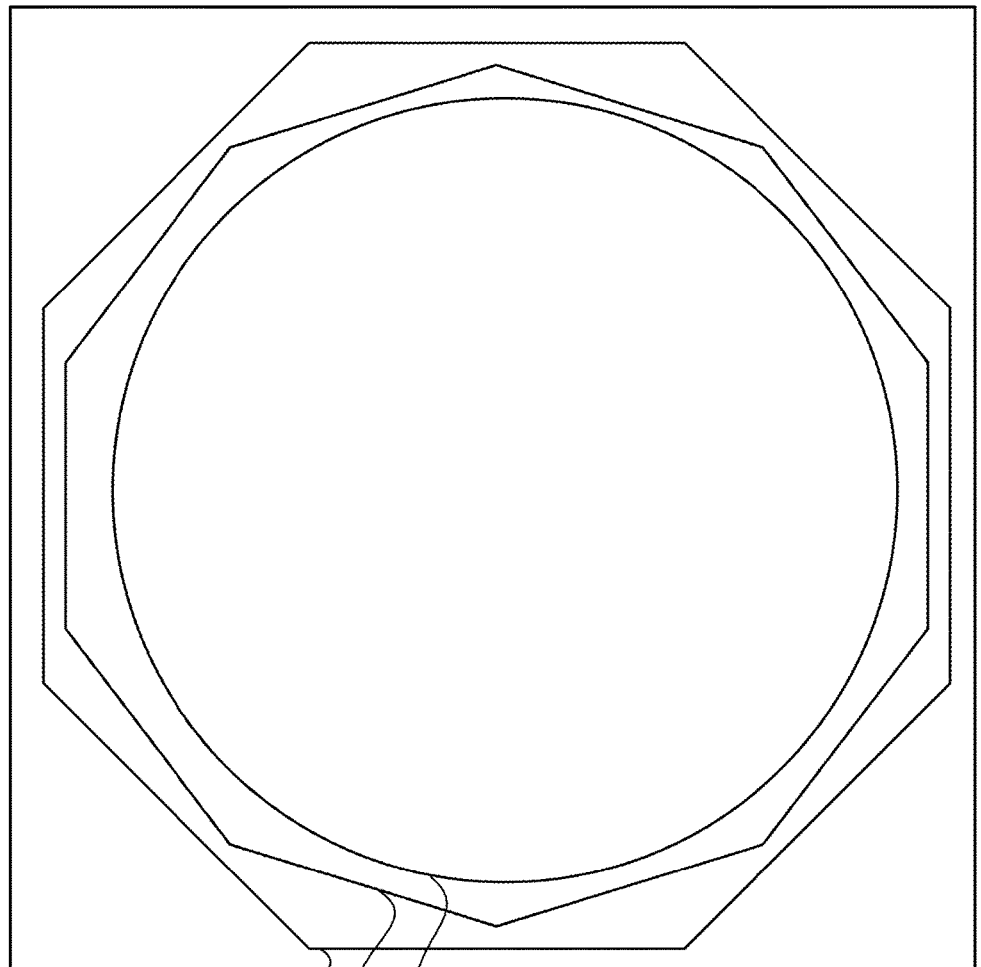
*Fig. 8A*

APPARATUS AND METHOD FOR PROVIDING POWER AT A STREETLIGHT

CROSS-REFERENCE TO RELATED APPLICATIONS

The present application is a continuation of U.S. application Ser. No. 17/102,354, which application was filed Nov. 23, 2020 and is incorporated herein by this reference as if fully set forth herein.

BACKGROUND

Technical Field

The present disclosure generally relates to a streetlight-based power interface. More particularly, but not exclusively, the present disclosure relates to a power tap device that taps a mains power circuit to provide a useful power signal via a consumer-level power interface.

Description of the Related Art

Power lines transport electricity from one locale to another; sometimes over great distances. In many cases, the power lines pass over, through, or otherwise in proximity to areas populated by people and other living things. Often, the power lines are "tapped" to provide electricity at one or more points. This "tapping" permits power passing over the power lines to be diverted for consumption by streetlights, street signs, traffic lights, businesses, homes, and for other things. When such a "tap" is made, the subordinate or secondary tapped powerline is hardwired into the device that will receive the power.

Conventional streetlight systems are known to those of ordinary skill in the streetlighting arts. Conventional streetlights are typically mounted above a roadway, parking lot, or the like on a streetlight pole, lamppost, or some other elevated structure. Historically, street lighting was provided by incandescent filament-based lighting sources. In modern times, high-intensity discharge lighting sources such as high-pressure sodium lamps are used to light streets and other areas. Even more recently, light emitting diode (LED) based luminaires are deployed to provide bright, controllable lighting with lower power consumption. In order to safely and effectively fulfill the needs of municipalities, governments, and private entities in a cost-efficient manner, most streetlight systems and sub-systems conform to one or more standards promulgated by a standards body.

The American National Standards Institute (ANSI) is a standards body that publishes and promotes standards for certain electrical equipment, mechanical equipment, and electromechanical equipment in use today. ANSI is a private, non-profit organization that oversees and administers development of voluntary consensus standards for products, services, processes, systems, protocols, and the like. It is also known that ANSI coordinates at least some U.S. standards with at least some international standards, which permits products manufactured according to U.S. standards to be used in other non-U.S. countries in the world.

Various standards developed by organizations, government agencies, consumer groups, companies, and others are accredited by ANSI. These standards are developed and promoted to provide consistent characteristics, definitions, terms, testing, implementation, and performance in products that are compliant with a given standard.

The National Electrical Manufacturers Association (NEMA) is one such organization that develops, promotes, or otherwise partners with ANSI. According to publicly available information, NEMA is the largest trade association of electrical equipment manufacturers in the United States. NEMA is a consortium of several hundred member companies that manufacture products used in the generation, transmission, distribution, control, and end use of electricity. These products are used in utility, industrial, commercial, institutional, and residential applications including lighting products installed over roadways, parking lots, constructions sites, pedestrian malls, manufacturing floors, and the like.

NEMA publishes standards documents, application guides, white papers, and other technical papers. NEMA also publishes and promotes several hundred technical standards for electrical enclosures, controllers, communication protocols, motors, wire, plugs, and receptacles among other equipment. Certain ones of NEMA's American National Standards directed toward Roadway and Area Lighting Equipment are referred to as ANSI C136 standards. At least one NEMA standard, referred to as ANSI C136.41, is directed to external locking type photo-control devices for street and area lighting.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) provide a permanent, semipermanent, or temporary streetlight-based power tap. In at least one embodiment, a housing of the streetlight-based power tap has a proximal face and a distal face. A connector compatible with a streetlight-based socket is integrated with the proximal face, and a socket compatible with a streetlight control device is integrated with the distal face. In at least some cases, the socket integrated with distal face of the streetlight-based power tap is functionally equivalent to the socket of the streetlight. A sidewall of the housing includes at least one consumer level power interface. Electronic circuitry within the housing taps into the mains power of the streetlight, converts the mains power into a consumer level power signal, and electrically couples a consumer level power signal to the consumer level power interface(s).

In a first embodiment, a power tap, comprises: a housing having a top surface, a bottom surface, and at least one side surface; a first male connector integrated with a substantially planar portion of the bottom surface, the first male connector having at least three pins arranged for substantially permanent electromechanical coupling to at least three corresponding receptacles of a first female connector that is integrated with a streetlight luminaire, wherein the at least three pins of the first male connector are arranged about a first central axis, the first central axis being substantially normal to the substantially planar portion of the bottom surface; a second female connector integrated with a substantially planar portion of the top surface, the second female connector having at least three receptacles arranged to receive at least three corresponding pins of a second male connector that is integrated with an electronic control device, wherein the at least three receptacles of the second female connector are arranged about a second central axis, the second central axis being substantially normal to the substantially planar portion of the top surface, wherein each male connector and each female connector is compliant with a roadway area lighting standard promoted by a standards body; power conversion circuitry arranged within the housing to receive a higher voltage input signal and to produce at least one lower voltage output signal; a power input circuit electrically coupling the first male connector to the power conversion circuitry; and a power output interface electrically coupled to the power conversion circuitry and arranged to expose the at least one lower voltage output signal.

In some cases of the first embodiment, the roadway area lighting standard promoted by the standards body is an American National Standards Institute (ANSI) C136 standard, and in some of these cases, the roadway area lighting standard promoted by the standards body is compliant with, or backwards compatible to, ANSI C136.41-2013.

Sometimes, the power tap of the first embodiment also comprises: at least one interface arranged to pass data signals between the power tap and the electronic control device. In these and other cases, the at least one interface is a dimming interface arranged to pass at least one analog dimming signal via at least one pair of electrical conduits. In these and still other cases, the at least one interface passes signals that conform with a digital addressable lighting interface (DALI) protocol.

In exemplary cases of the first embodiment, the power tap also comprises: at least one utility-grade power metering circuit; and at least one communication circuit arranged to communicate information generated by the at least one utility-grade power metering circuit. The at least one utility-grade power metering circuit sometimes comprises: a line-side power metering circuit; and a load-side power metering circuit. In at least some of these cases, the information generated by the at least one utility-grade power metering circuit includes first power information associated with an incoming power line to the streetlight luminaire and second power information associated with at least one of: power consumed by the luminaire, power consumed by the electronic control device, and power consumed by a device plugged in to the power tap. Sometimes, the at least one communication circuit is arranged to receive power from the electronic control device.

In a second embodiment, a method of providing power at a streetlight, comprises: exposing a socket of a streetlight luminaire, the socket compliant with a roadway area lighting standard promoted by a standards body; electromechanically coupling a power tap to the socket, the power tap including a first male connector having at least three pins participating in the electromechanical coupling of the power tap to the socket; providing a higher voltage input signal electrically tapped from the first male connector to power conversion circuitry of the power tap; producing, with power conversion circuitry, a lower voltage output signal from the higher voltage input signal; providing the lower voltage output signal via an output power interface; and consuming at least some of the lower voltage output signal with a device electrically coupled to the output power interface.

In some cases of the second embodiment, the method includes coupling a smart streetlight controller to the power tap. Sometimes in the second embodiment, the method also includes electrically coupling a first utility-grade power metering circuit to the first male connector; electrically coupling a second utility-grade power metering circuit to the output power interface; and collecting line-side and load-side power consumption information with, respectively, the first and second utility-grade power metering circuits. In these cases, the method can sometimes also include coupling a smart streetlight controller to the power tap; and communicating the line-side and load-side power consumption information to the smart streetlight controller. In at least some cases, the second embodiment includes communicating the line-side and load-side power consumption information to a remote computing device.

In a third embodiment, a streetlight-based power system, comprises: a plurality of streetlights in a defined geographic area, each of the plurality of streetlights having a respective luminaire, and each of the luminaires having a respective first female connector that is compliant with a roadway area lighting standard promoted by a standards body; a plurality of smart streetlight controllers, each of the plurality of smart streetlight controllers electrically coupled to a respective streetlight luminaire of a different one of the plurality of smart streetlight controllers; two or more power taps electromechanically coupled to a corresponding two or more of the plurality of streetlights, wherein each power tap is positioned between the luminaire of the respective streetlight and the smart streetlight controller of the respective streetlight, each power tap including: a first male connector having at least three pins electromechanically coupling the power tap to the first female connector of the luminaire of the respective streetlight; a second female connector having at least three receptacles receiving at least three corresponding pins of a male connector that is integrated with a respective smart streetlight controller; power conversion circuitry arranged within the power tap to receive a higher voltage input signal and to produce at least one lower voltage output signal; and a power output interface electrically coupled to the power conversion circuitry and exposing the at least one lower voltage output signal.

In some cases of the third embodiment, the two or more electronic devices are holiday lighting devices. Sometimes, the power conversion circuitry of a certain power tap is powered by a direct current (DC) voltage signal passed from a respective smart streetlight controller. And in at least some cases, each signal of the second female connector of a certain power tap is electrically coupled to a corresponding signal of the first female connector of a respective luminaire, and in these and other cases, the power output interface includes at least two sockets arranged to receive respective plugs of the two or more electronic devices.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIGS. 8A-8F are streetlight-based power tap housing embodiments; and

DETAILED DESCRIPTION

Figure 1:
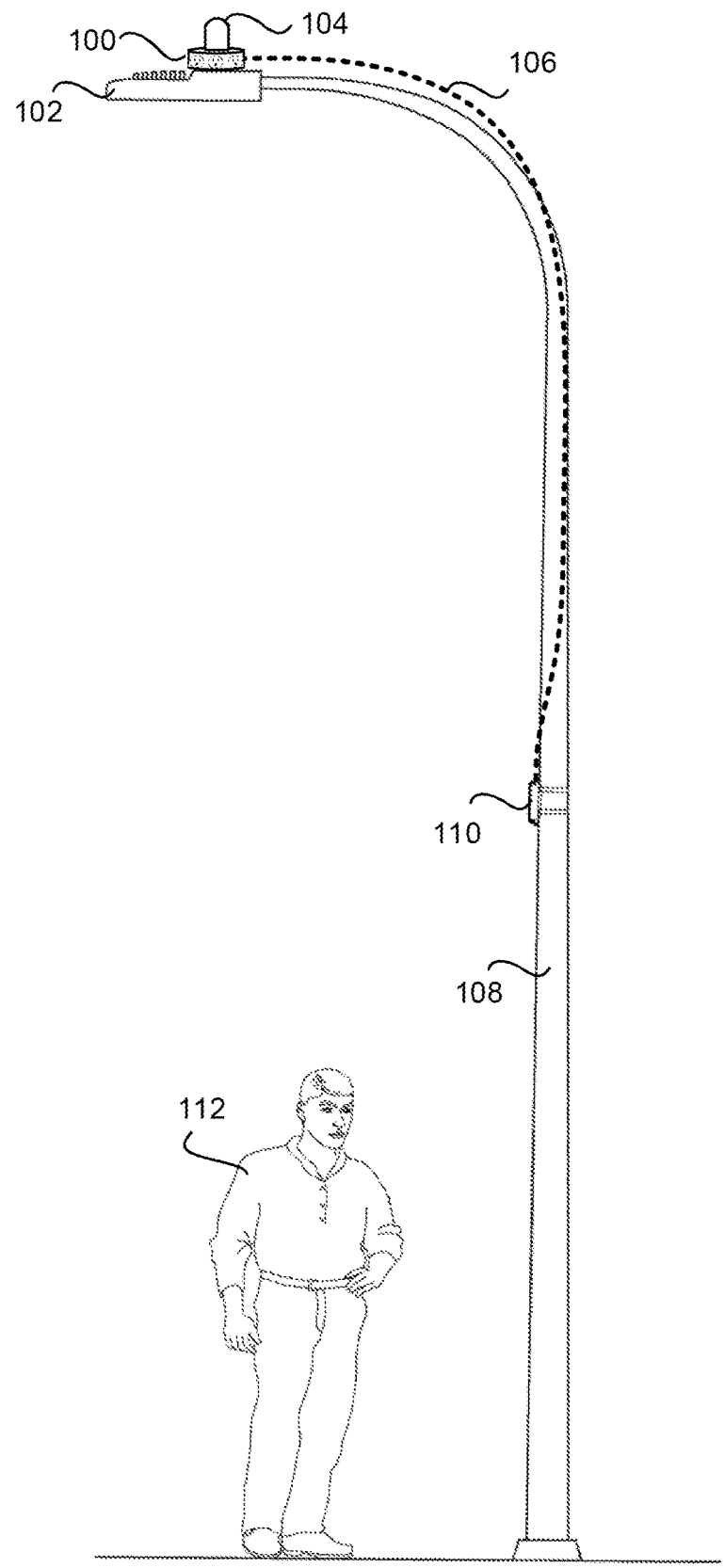
FIG. 1 is an embodiment of a streetlight-based power tap electromechanically coupled between a streetlight luminaire and a smart sensor device.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring more detailed descriptions of the embodiments.

The present disclosure generally to a streetlight-based power tap device that taps a mains power circuit to provide a useful power signal via a consumer-level power interface. The device, method, and system embodiments described in this disclosure (i.e., the teachings of this disclosure) illustrate and describe a permanent, semipermanent, or temporary streetlight-based power tap. Embodiments include a housing with a proximal face and a distal face. A connector compatible with a streetlight-based socket is integrated with the proximal face, and a socket compatible with a streetlight control device is integrated with the distal face. A sidewall of the housing includes at least one power interface (e.g., a 220 VAC socket, a 110 VAC socket, a power cord with a pigtail, or the like). Electronic circuitry within the housing taps into the mains power of the streetlight, converts the mains power into a desirable power signal (e.g., 110 VAC, 220 VAC, or some other power signal), and electrically couples the desirable power signal to one or more power interfaces.

Prior to setting forth the embodiments however, it may be helpful to an understanding thereof to first set forth definitions of certain terms that are used hereinafter. Unless a definition hereinbelow is expressly stated to be limiting or exhaustive, the following definitions should be understood by those of skill in the art as non-limiting and non-exhaustive guidance provided to assist in understanding the inventive subject matter of the present disclosure.

The term "tap" is used, in all its grammatical forms, throughout the present specification and claims as a verb or a noun, the determination of which (i.e., whether a verb or noun) is made by the context of term's use. When used as a verb, "tap" refers to an act of coupling a second electrically conductive structure (e.g., a wire, cable, trace, or other conduit; a node, a component, a circuit, or the like) to a first electrically conductive structure. One use of "tap" as a verb may be, for example, "Power for a streetlight-based device is tapped from mains power." Conversely, when used as a noun, "tap" refers to a first device that provides electric power to a second device. One use of "tap" as a noun may be, for example, "Plug the string of holiday lights into the streetlight-based power tap."

The term "power interface" is used in the present specification and claims to refer to any appropriate structure, mechanism, or method for delivering power. A power interface may include a plug, a socket, a pigtail, a wire, a cable, a conduit, a terminal or terminal block, a bus, a bus bar, a switch, a node, or any other suitable structure.

"Consumer-level power" is any desirable power level that may be common or frequently accepted in the jurisdiction where a streetlight-based power tap is installed. In the United States, for example, consumer-level power may be about 110 volts alternating current (110 VAC) or 220 volts (220 VAC).

FIG. 1 is an embodiment of a streetlight-based power tap 100 electromechanically coupled between a streetlight luminaire 102 and a smart sensor device 104 (e.g., a streetlight controller). The electromechanical coupling between the power tap 100 and the luminaire 102 and between the power tap 100 and the smart sensor device 104 is implemented via set of one or more sockets and connectors (not shown in FIG. 1) that are compliant with a roadway area lighting standard promoted by a standards body. An electrical conduit 106 is electromechanically coupled to the power tap 100. The electrical conduit 106, in the embodiment of FIG. 1, is routed down the streetlight pole 108 to an electrically powered device 110. In the embodiment, the luminaire 102 may be powered by mains power, and when suitably energized, at the direction of the smart sensor device 104 for example, the luminaire 102 provides light in an area occupied by a user 112. The luminaire 102 is in at least some cases elevated between 20 feet and 40 feet above a roadway.

The smart sensor device 104 may include one or more light sensors. Light sensors detect ambient light in proximity to the luminaire 102. Using light sensor data, the smart sensor device 104 may control one or more characteristics of light produced by a light source mounted or otherwise integrated in the luminaire 102. The characteristics can include the volume of light output (i.e., lumens or luminous flux), the color or frequency of output light, on/off timing, situational lighting, and the like. In at least some cases, the characteristics of light output from one luminaire are cooperative with characteristics of light output from other (e.g., adjacent) streetlight luminaires.

The power tap 100 may be particularly arranged for mounting on a light pole, and even more particularly arranged for mounting on a light fixture (e.g., a luminaire). In these cases, a luminaire 102 in at least some embodiments is aerially mounted between about 20 to 40 feet above the area to be illuminated (e.g., ground level, a roadway, a parking surface, and the like), and the luminaire 102 is mounted on a streetlight pole 108, a building, or some other structure. In some cases, the streetlight poles, light fixtures, streetlights, buildings, roadways, parking surfaces, or any combination thereof are administered by a government entity.

The electrically powered device 110 may include any one or more electrically powered devices. For example, the electrically powered device 110 may be configured as a holiday lighting display, a sign, a piece of test equipment, a traffic control signal, a safety signal, an emergency device, construction equipment, an air quality sensor, environmental sensor, pollution sensor, carbon monoxide sensor, carbon dioxide sensor, particulate sensor, toxin sensor, smoke detector, fire detector, lightning detector, thermometer, tilt sensor, vibration sensor, pressure sensor, crash detection device, microphone, speaker, horn, light source, light sensor, LED driver, light group controller, light-ballast device, alarm, wind speed measurement device, humidity sensor, flood detector, freezing condition detector, communication device, infrared detection sensor, mobile device transceiver detector, riot sensor, crowd sensor, pedestrian sensor, child sensor, disabled-person sensor, vehicle sensor, wildlife or other animal sensor, geophysical sensor of any type, weather sensor of any type, or nearly any other device powered by electricity. The previous electrically powered devices is non-limiting and non-exhaustive. Many other electrically powered devices are also contemplated.

Figure 2:
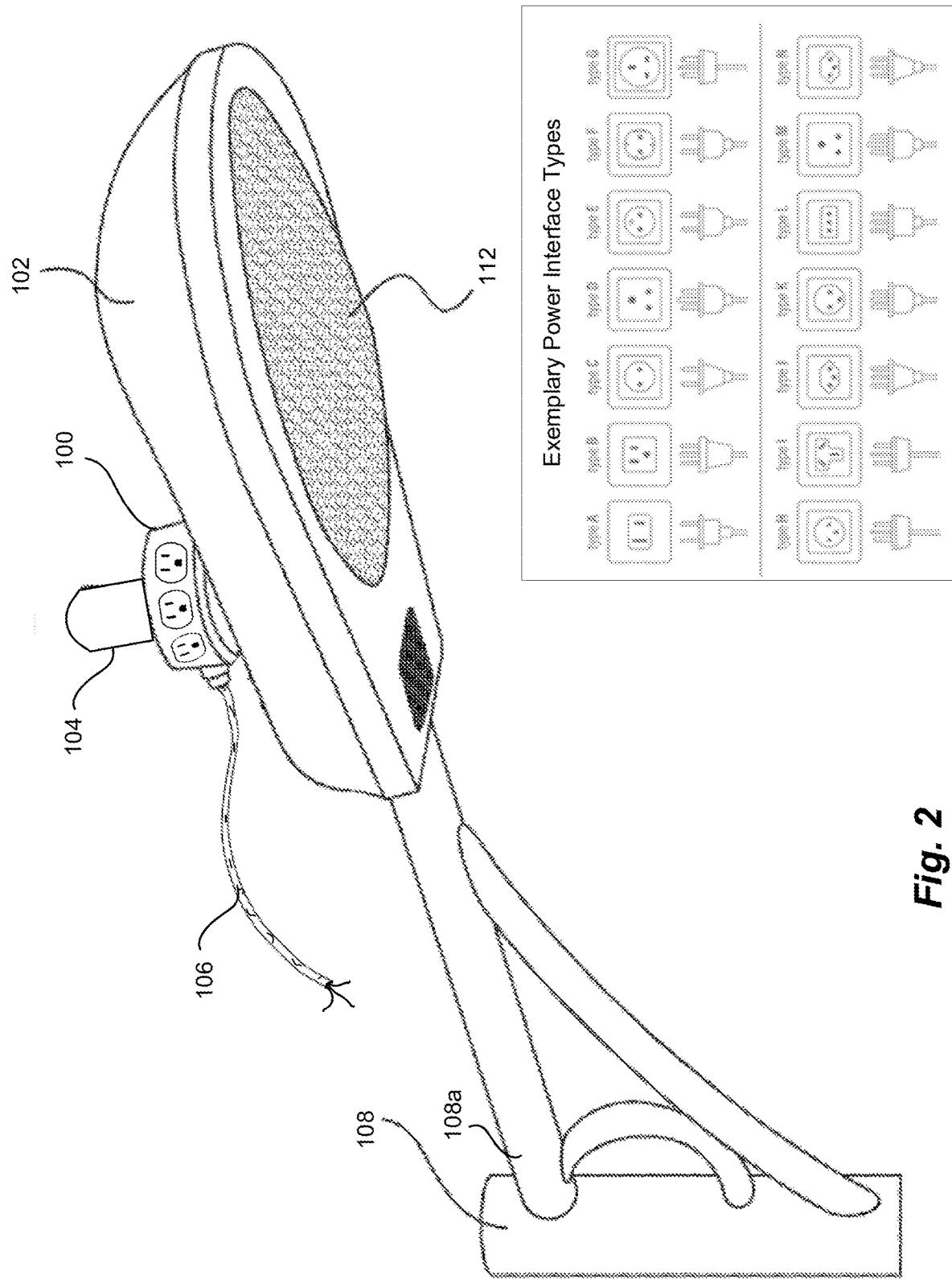
FIG. 2 is the streetlight-based power tap device of FIG. 1 in more detail.

FIG. 2 is the streetlight-based power tap 100 device of FIG. 1 in more detail. A portion of the streetlight pole 108 is shown, and the streetlight luminaire 102 is also shown. A streetlight support structure 114 (e.g., an "arm" or luminaire support) supports the luminaire 102. The luminaire 102 has a top-side connector (e.g., a socket) that is compliant with a roadway area lighting standard promoted by a standards body such as ANSI C136.41 (e.g., a NEMA-based connector/socket system). The power tap 100 includes a corresponding connector (e.g., a set of "pins") at its base, which permits electromechanical coupling of the streetlight-based power tap 100 to the luminaire 102. The power tap 100 also includes a top-side connector (e.g., a socket) that is compliant with a roadway area lighting standard promoted by a standards body such as ANSI C136.41 (e.g., a NEMA-based connector/socket system). In at least some cases, the socket integrated with distal face of the streetlight-based power tap 100 is functionally equivalent to the socket of the streetlight luminaire 102.

The smart sensor device 104 in FIG. 2 is optional. When so included, the smart sensor device 104 is embodied as a streetlight control device (e.g., a pulse width modulation (PWM) controller, a light emitting diode (LED) driver, dimming circuit, ballast, and certain other circuits). For example, in at least some cases, the smart sensor device 104 includes particular switching and control circuits. In some cases, other support circuitry including a controller compatible with a Digital Addressable Lighting Interface (DALI) protocol (i.e., DALI controller), and a DALI power supply are also present. The smart sensor device 104 is arranged to direct a volume of light 112 output from the luminaire 102.

In some cases, the smart sensor device 104 is configured to send, receive, or send and receive information from one or more devices that comply with a DALI protocol (i.e., DALI compliant devices). In this embodiment of FIG. 2, the smart sensor device 104 communicates by passing commands and data through its connector to and through the top-side connector of the power tap 100. Inside the housing of the power tap 100, a proximal end of a two-wire bus (i.e., the DALI bus) is electrically coupled to a DALI controlled device (i.e., control gear) controller. In at least some cases, the two-wire bus (i.e., the DALI bus) is also electrically coupled to the bottom-side connector of the power to 100. In this way, Dali controls may also be passed into the luminaire 102. The two-wire bus is implemented as a DALI network bus cable, a jacketed wire having two or more separate and distinct electrical conduits, re-used mains wiring, or in some other configuration that is at least compatible with a standardized DALI protocol or other like protocol.

Power conversion circuitry is arranged within the housing of the power tap 100 to receive a higher voltage input signal of the mains power signal passed from the luminaire 102 and to produce at least one lower voltage output signal (i.e., a consumer-level power signal). In the embodiment of FIG. 2, various consumer-level power output interfaces are electrically coupled to the power conversion circuitry and arranged to expose the at least one lower voltage output signal. Three Type B sockets are arranged in a sidewall of the power tap 100. The three sockets are not identified to avoid unnecessarily obscuring the subject matter of FIG. 2. For reference, and not limitation, a non-exhaustive set of exemplary power interface types are also illustrated in FIG. 2. In addition to the 3 sockets, a portion of the electrical conduit 106 is also shown in FIG. 2. The electrical conduit 106 may include a Type B plug that is electromechanically coupled into a Type B socket, or another cases, the electrical conduit 106 is hardwired through a sidewall of the housing of the power tap 100 at a proximal end, and a pigtail is provided for direct wiring into and electrically powered device. In the embodiment of FIG. 2, the electrical conduit 106 includes three electrical conductors, which might be a line signal, a hot signal, and a neutral signal. Other numbers of electrical conductors are contemplated, and other electrical signals passing via said electrical conductors are also contemplated.

Figure 3:
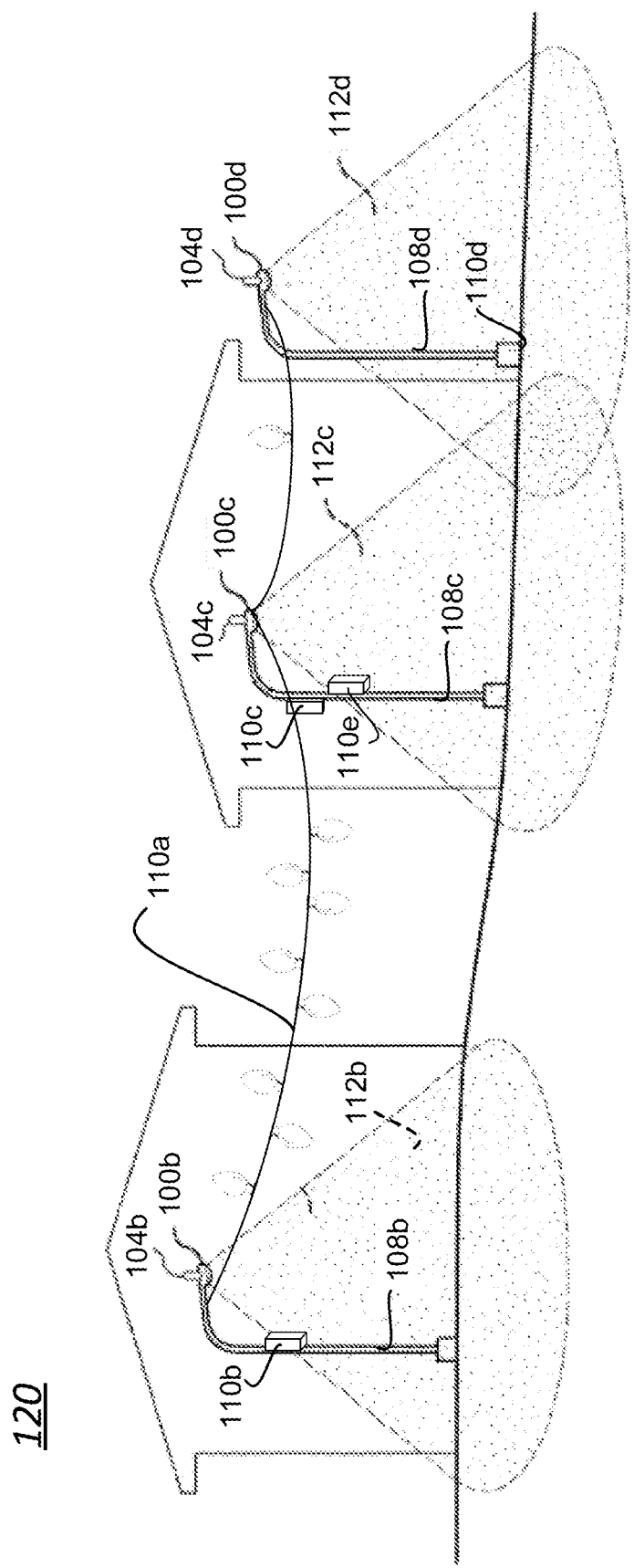
FIG. 3 is a systemwide deployment of certain embodiments of streetlight-based power tap devices.

FIG. 3 is a systemwide deployment 120 of certain embodiments of streetlight-based power tap devices. In the system level deployment 120, three streetlight poles 108b, 108c, 108d and corresponding fixtures each with a streetlight power tap 100b, 100c, 100d, and a respective smart sensor device 104b, 104c, 104d (e.g., three smart streetlight controllers) are shown. In some cases, a light sensor detects both ambient light from above its respective fixture and other light from different directions. For example, where light 112c, 112d from two light sources overlap, one or more of the smart sensor devices 104b, 104c, 104d may adjust their light output. The adjustment may be a reduction in light output, a directional change to light output, or some other adjustment. Along these lines, where light 112b, 112c from two light sources do not overlap at all, there may be areas in need of additional illumination. In this case, one or more of the smart sensor devices 104b, 104c, 104d may adjust their light output.

In some cases, a plurality of electrically power devices 110a, 110b, 110c, 110d, 110e are electromechanically coupled to a plurality of the streetlight-based power taps 100b, 100c, 100d. The electrically powered devices may include holiday decorations 110a, a sign, a piece of test equipment, a traffic control signal, a safety signal, an emergency device, construction equipment, an air quality sensor, environmental sensor, pollution sensor, carbon monoxide sensor, carbon dioxide sensor, particulate sensor, toxin sensor, smoke detector, fire detector, lightning detector, thermometer, tilt sensor, vibration sensor, pressure sensor, crash detection device, microphone, speaker, horn, light source, light sensor, LED driver, light group controller, light-ballast device, alarm, wind speed measurement device, humidity sensor, flood detector, freezing condition detector, communication device, infrared detection sensor, mobile device transceiver detector, riot sensor, crowd sensor, pedestrian sensor, child sensor, disabled-person sensor, vehicle sensor, wildlife or other animal sensor, geophysical sensor of any type, weather sensor of any type, or nearly any other device powered by electricity.

In FIG. 3, the various smart sensor devices 104b, 104c, 104d are electrically, communicatively, or electro-communicatively coupled to one or more respective DALI controlled devices such as the electrically powered device 110c, 110d, 110e, 110f. To avoid unnecessarily obfuscating FIG. 3, the conduits (e.g., wire, DALI network bus cables, or the like) are not shown. In the system level deployment 120, a first electrically powered device 110f may be arranged to dynamically detect motion (e.g., infrared detection sensor, mobile device transceiver detection, riot sensor, crowd sensor, pedestrian sensor, child sensor, disabled-person sensor, vehicle sensor, wildlife sensor, or the like), and a DALI controller in the smart sensor device 104b may be arranged to adjust light output to increase, decrease, or change other parameters such as a direction of light output when the motion is directionally detected or detected based on some other parameter. A second DALI compliant electrically powered device 110c may be an air quality sensor, and a third DALI compliant device electrically powered 100e may be a weather or other environmental condition sensor (e.g., wind sensor, humidity sensor, temperature sensor, vibration sensor, pressure sensor, or any one or more of the like). Yet one more DALI compliant electrically powered device 110d may be a water level sensor, freezing condition sensor, or the like. May other DALI compliant and non-DALI compliant electrically powered device types, deployment locations, and deployment conditions are contemplated.

In some cases, each of the separate and distinct streetlight poles 108b, 108c, 108d in the system level deployment 120 of FIG. 3 operates its own closed DALI network. In other cases, some or all of the separate and distinct streetlight poles 108b, 108c, 108d in the system level deployment 120 implement a common DALI network with one or more DALI control devices and a plurality of DALI controlled (i.e., DALI control gear) devices. A DALI network may be configured as a daisy chain, a star topology, or a combination of daisy chain and star topologies. Additionally, a DALI network may operate with one, two, or more DALI control devices. One limitation of a DALI network, however, is that a DALI-compliant power supply is limited to outputting 250 mA. Accordingly, the inventors have recognized that in cases along the lines of the system level deployment 120 where a plurality of separate and distinct streetlight poles are deployed, it would be technically beneficial to design and build a streetlight-based power tap 100 that can power the electrically powered devices.

Figure 4:
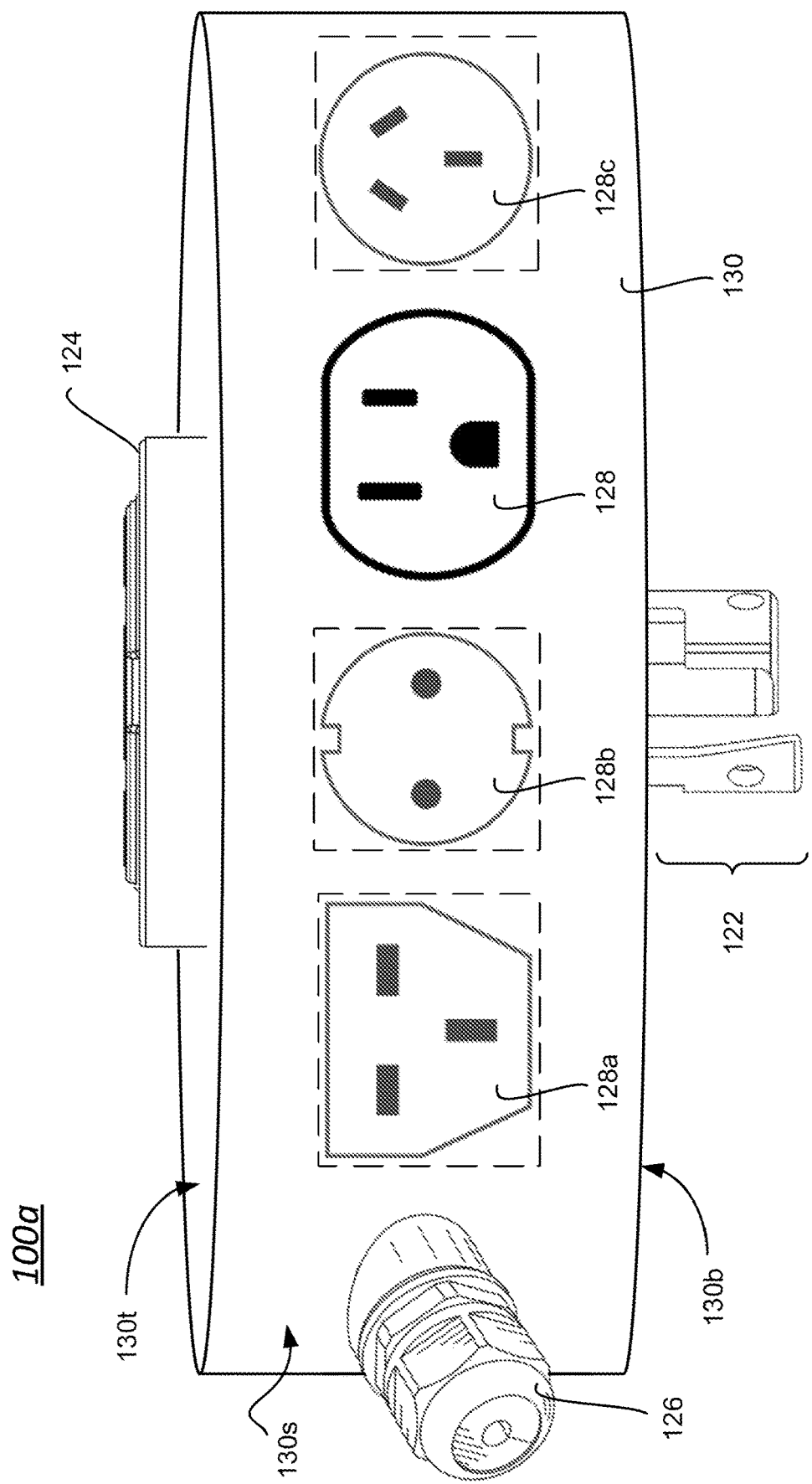
FIG. 4 is an embodiment of a streetlight-based power tap.

FIG. 4 is an embodiment of a streetlight-based power tap 100a. The power tap 100a of FIG. 4 is along the lines of the power taps 100, 100b-100f of FIGS. 1-3. The power tap 100a includes a multi-pin connector 122 compliant with a roadway area lighting standard promoted by a standards body. The multipin connector 122 may be referred to in some cases as a multi-pin NEMA connector. In at least some embodiments the multi-pin connector 122 is compatible with an ANSI C136 standard promulgated by the National Electrical Manufacturers Association (NEMA). The multi-pin connector 122 may be compatible with the standard referred to as ANSI C136.41, ANSI C136.41-2013, or some other standard. Alternatively, the multi-pin connector 122 may be implemented with some other connector useful for external locking type photo-control devices for street and area lighting The streetlight-based power tap 100a includes an integrated multi-pin receptacle 124 compliant with a roadway area lighting standard promoted by a standards body. Though not expressly marked or visible in FIG. 4, the multi-pin receptacle 124 embodiment, which in some cases is referred to as a multi-pin socket, may include three primary apertures, which are arranged to electromechanically receive a plurality of pins (e.g., three pins) of a compatible multi-pin connector (e.g., a multi-pin connector 122). In some embodiments, other signals are also passed through the multi-pin receptacle 124 and the multi-pin connector 122. The multi-pin devices may include one or more contacts to pass these other signals, which may include a plurality of low power direct current (e.g., 0 VDC to 10 VDC) dimming control signals, device power signals, digital addressable lighting interface (DALI) signals, or signals having some other format or purpose.

In FIG. 4, the power tap 100a may optionally include one or more twist lock connectors 126 that provide cable access to the inside of the power tap. In at least some cases, the twist lock connectors 126 are water-tight, and in these or in other cases, the twist lock connectors 126 provide strain relief to cables that pass through the connectors. The twist lock connectors 126 in at least some cases expose a gland connector for 3-15 mm diameter cable resistant to foreign material ingress according to Ingress Protection standard IP67. The twist lock connectors 126 are used in some embodiments to pass a an electrical conduit (e.g., a power cable; FIGS. 5-6) from the power tap 100a to an electrically powered device. Such a power cable may be terminated with a pig-tail for direct wiring to the electrically powered device, a plug of any desirable configuration, a socket of any desirable configuration, or some other consumer-level power interface. In other embodiments, rather than including a twist lock connector 126 or other like structure, a power cable passes through a wall of the power tap housing directly or via some other aperture or structure arranged to permit permanent or semi-permanent passage of the cable.

The power tap 100a may alternatively, or also, include one or more sockets of any desirable type. The embodiment of FIG. 4 illustrates a first Type B socket 128, which is generally known in the United States to provide a 110 VAC consumer-level power interface. Other optional sockets, which may also be referred to as receptacles or power receptacles, include a Type G socket 128a, which is generally known in the United Kingdom, a Type C socket 128b, which is generally known in the European Union, and a Type I socket 128c, which is generally known in Australia. Other sockets are contemplated, such as, but not limiting or exhaustive, the sockets of FIG. 2. In at least some cases, individually or collectively a twist lock connector, a socket, a power cable, or the like integrated with a power tap may be referred to as a consumer-level power interface. For brevity, any one or more of the sockets 128, 128a, 128b, 128c or other receptacles represented in the present disclosure may be referred to as a socket 128.

The power tap 100a includes a housing 130. The housing may in some cases be formed as a "disc," a "puck," or a device having some other recognizable shape or recognizable cross-section shape (e.g., a circle, a sphere, a truncated sphere, a square, a rectangle, an octagon, a hexagon, a pentagon, a triangle, or any other suitable regular or irregular shape). In at least some cases, the housing 130 includes a housing top surface 130$t$, a housing sidewall 130$s$ or housing sidewall surface 130$s$, and a housing bottom surface 130$b$.

Exemplary embodiments of the housing 130 may have any one or more of a diameter, a length, a width, a height, a surface area, and a volume. In some cases, a housing having an arched top or bottom surface may have a first height, a second height, and a formula to determine height at any suitable location on the particular surface. In at least one case, a housing 130 has a length of between about two inches (2 in.) and about ten inches (10 in.), a width of between about two inches (2 in.) and about ten inches (10 in.), and a height of between about one-half inch (0.5 in.) and about four inches (4 in.). In other cases, a housing has a diameter of between about two inches (2 in.) and about ten inches (10 in.) and a height of between about one-quarter inch (0.25 in.) and about six inches (6 in.); and in at least some of these cases, the height ranges from about one and one-half inches (1.5 in) and about two and one-half inches (2.5 in.). Sometimes, the volume of a housing is between about thirteen and one-half cubic inches (13.5 in.$^3$) and about one hundred twenty-eight cubic inches (128 in.$^3$).

The housing 130 of the power tap 100$a$ of FIG. 4 has a substantially cylindrical form factor wherein a horizontal cross section has a substantially circular shape. Other form factors and horizontal cross-sectional shapes are of course considered. In at least some cases, the diameter of the housing 130 is between about two inches (2 in.) and ten inches (10 in.). In some embodiments, such as shown in the housing 130 of FIG. 4, sidewalls of the device are substantially vertical or within about 30 degrees of vertical. In other embodiment, sidewalls of the housing 130 that provide height to the device are segmented such that some portions of the wall are vertical or near-vertical and other portions of the wall structures are closer to horizontal (see, for example, FIGS. 5A, 5B, 6). Many shapes, styles, and dimensions of wall structures have of course been considered. In at least some embodiments, the walls of the housing 130 are formed to create a height of the device between about one and one-half inches (1.5 in.) and about six inches (6.0) inches.

One or more portions of the housing 130 of power tap 100$a$ may be formed of metal, plastic, or some other material, alone or in any suitable combination. In some cases, the housing 130 is painted, bonded, or otherwise coated with a weather-resistant material (e.g., a varnish, an enamel, a fluoropolymer, a powder-coating, or the like). In some cases, the housing 130 is arranged in color, shape, material, or some other characteristic to be resistant to birds, insects, or other pests. For example, the housing 130 may be mirrored, low-friction, spiked, or enabled with vibration, heat, cooling, an audio transducer, or some other anti-pest feature. In at least some embodiments, the housing 130 is constructed according to a standard published by the International Electrotechnical Commission (IEC) as Ingress Protection standard IP55. A housing constructed and deployed to IP55 is generally sufficient to resist or otherwise prevent dust and other solid materials from entering the housing and also sufficient to resist or otherwise prevent low pressure liquid (e.g., water) jetted from any direction from entering the housing.

Figure 5A:
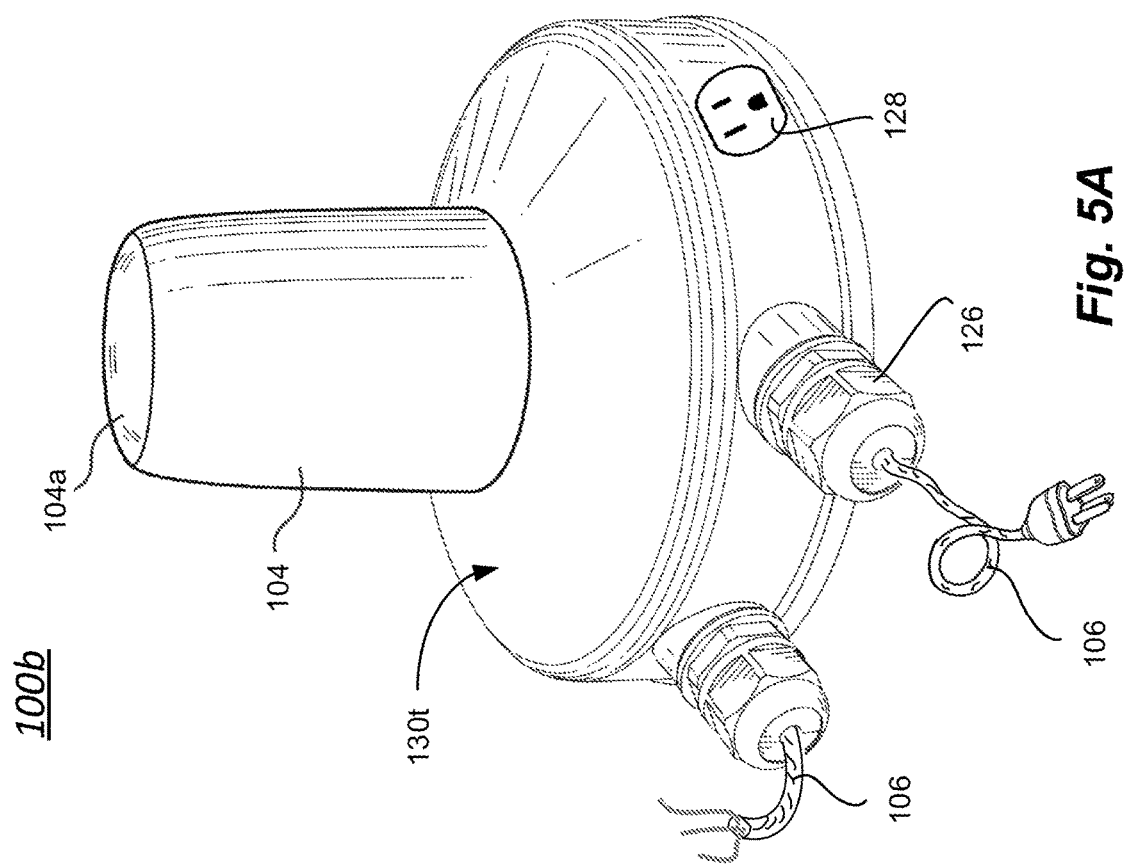
FIGS. 5A and 5B are an embodiment of another streetlight-based power tap having an optional smart sensor device electromechanically coupled thereto.
Figure 5B:
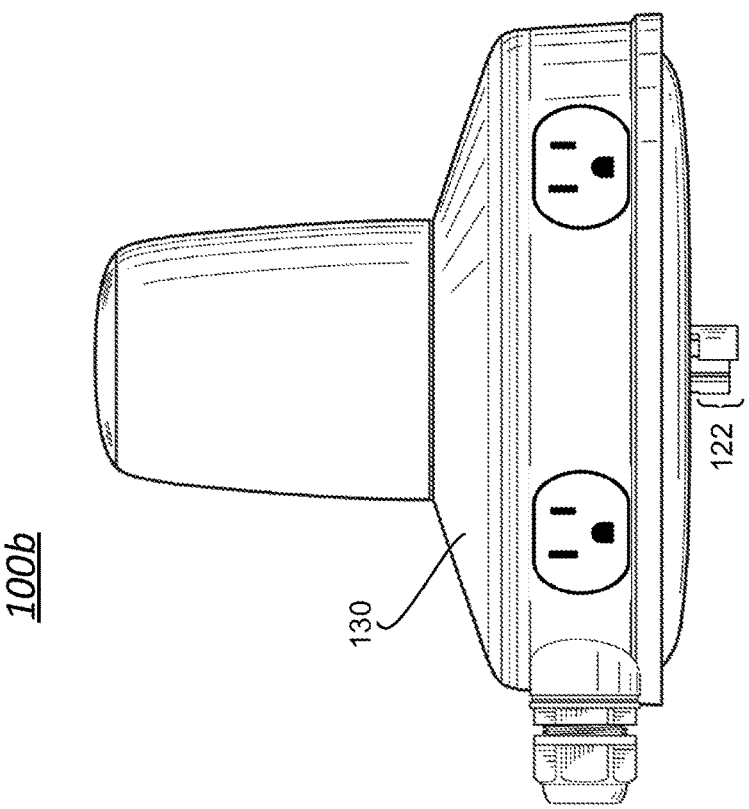
Figure 6:
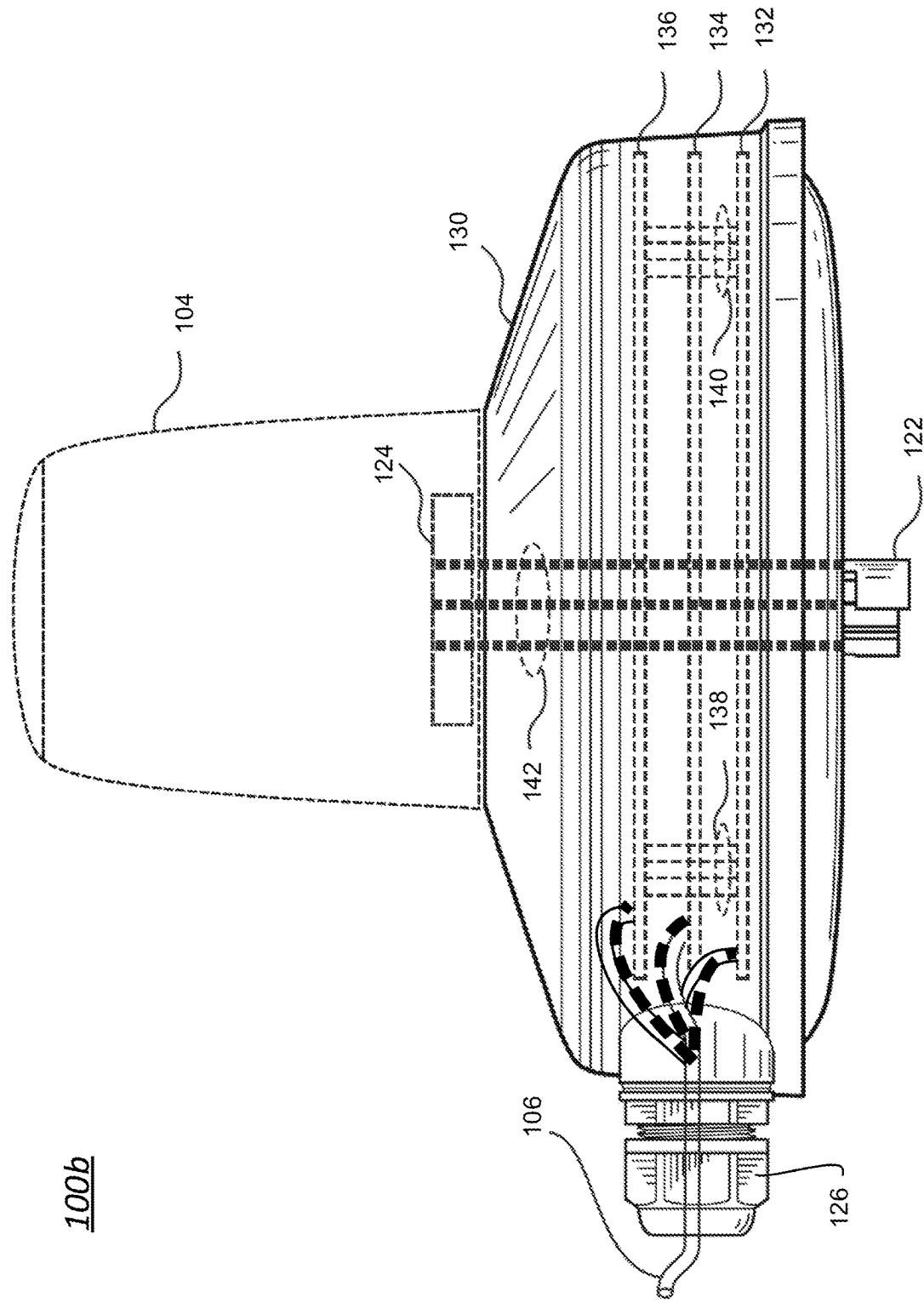
FIG. 6 is a cutaway side view of the streetlight-based power tap and optional smart sensor device of FIGS. 5A and 5B.

FIGS. 5A and 5B are an embodiment of another streetlight-based power tap 100$b$ having an optional smart sensor device 104 electromechanically coupled thereto. In the present disclosure, FIGS. 5A-5B may be collectively referred to as FIG. 5. Reference identifiers for structures earlier identified are in some cases repeated for clarity and in other cases omitted for brevity.

The optional smart sensor device 104, which in FIGS. 5-6 is arranged as a smart streetlight controller, includes an optional light-transmissive structure 104$a$. The light-transmissive structure 104$a$ may be a lens, a membrane, a window, or some other like structure. The light-transmissive structure 104$a$ may be clear, translucent, colored, polarized, filtered, or it may have other suitable properties and characteristics.

The optional smart sensor device 104 includes a light sensor module (not shown in FIG. 5). The light sensor module, which may also be referred to as simply a light sensor, includes a light sensor surface that collects, absorbs, or otherwise detects photons, and an electronic circuit that generates a representation of light that is impacting the light sensor surface. The light sensor module may be arranged to generate at least one light signal (e.g., an ambient light signal, a focused light signal, a data-infused light signal, or the like). Light signals generated by the light sensor module may be digital values between a lower threshold and an upper threshold (e.g., between 0 bits and 1024 bits) that represent the amount of luminous flux (e.g., photons) that strike the light sensor module at a particular point or within a particular time period. A processor-based light control circuit (not shown in FIG. 5) may be arranged to provide a light control signal based on at least one ambient light signal generated by the light sensor module, and in these cases, the light control signal may be used to direct characteristics of light output from a light source integrated in the corresponding light fixture.

The smart sensor device 104 may also include cellular and non-cellular-based wireless capabilities (e.g., LTE, 5G, WiFi, Bluetooth, etc.), local edge processing capabilities, and other features. In this way, the smart sensor device 104 may work as a traditional light sensor for it associated streetlight luminaire 102, and the smart sensor device 104 may provide other "smart" services. The smart sensor device 104, for example, may receive directions or other control information from a different smart sensor device 104, from a mobile device, from a remote computing server, or from some other source. The smart sensor device 104 may also have one or more embedded algorithms that direct operations of an associated luminaire 102 such as variable illumination based on time, season, external conditions, motion detection, sound detection, or the like. The smart sensor device 104 may have one or more sensors coupled thereto that provide actionable sensor input data that is used to control light produced b an associated luminaire 102. In still other cases, the smart sensor device 104 is arranged as a WiFi access point, a WiFi point in a mesh network, a small cell, or some other wireless data gateway.

Optional electrical conduits 106 pass through a sidewall of the streetlight-based power tap 100$b$. Such conduits are temporarily placed, semi-permanently placed, or permanently placed directly through a sidewall (FIG. 1), or alternatively, in FIG. 5 for example, passed via a twist lock connector 126. In some cases, the electrical conduit is terminated with a pigtail, in other cases, the electrical conduit 106 is terminated with a socket, a receptacle, a plug, or some other consumer-level power interface.

FIG. 6 is a cutaway side view of the streetlight-based power tap 100$b$ and optional smart sensor device 104 of FIGS. 5A and 5B. In the embodiment of FIG. 6, the multi-pin receptacle 124 that is compliant with a roadway area lighting standard promoted by a standards body and the smart sensor device 104 are shown as optional structures as indicated by dashed lines.

Three optional levels of processing circuitry are shown in the streetlight-based power tap 100b of FIG. 6, which include a first processing circuit board 132, a second processing circuit board 134, and a third processing circuit board 136. In other streetlight-based power tap embodiments, more or fewer processing circuit boards are present, and even in some cases, discrete electronic components or circuits (e.g., connectors, nodes, headers, wires, cables, sockets, receptacles, and the like) are arranged without any circuit boards. In these and other streetlight-based power tap embodiments contemplated, circuit boards are horizontally mounted, vertically mounted, substantially circular, substantially square, or having other shapes, sizes, and configurations. In some cases, circuit boards or other structures in the streetlight-based power tap 100b are positively keyed to facilitate assembly.

The first, second, and third processing circuit boards 132-136 are formed as modular units. In some cases, the modular layout provides utilitarian benefits related to heat generation, heat dissipation, circuit re-use, radio wave interference reduction, easier or otherwise more efficient manufacturing processes, opportunities to provide combine more or fewer features within a streetlight-based power tap, and the like. Accordingly, the modular structure of the streetlight-based power tap 100b is more than simply design choice. Instead, several of the modular features described in the present disclosure have been invented to solve specific problems and provide desirable benefits.

The first, second, and third processing circuit boards 132-136 are mechanically, electrically, or electromechanically coupled. A first coupling structure 138 couples the three circuit boards according to a power bus, a second coupling structure 140 couples the three circuit boards according to a data bus, and in the embodiment of FIG. 6, a third coupling structure 142 optionally couples pins of the multi-pin connector 122 through the first, second, and third processing circuit boards 132-136 to pins of the multi-pin receptacle 124. The coupling structures may include wires, cables, bars, or some other type of electrical conduits. The coupling structures may also include pins, receptacles, housings, standoffs, bushings, contacts, and other suitable electrical, mechanical, or electromechanical structures.

In at least one embodiment, the optional first processing circuit board 132 is referred to as a power board. The first processing board may include a first interface to the multi-pin connector 122, which may provide a first pin, a second pin, and a third pin. In at least some cases, the first pin is wired to provide a common/neutral/ground contact, the second pin is wired to provide a power/line voltage contact, and the third pin is wired to provide a load contact. In at least some cases, a powerline source at or greater than 200 VAC is coupled to the three corresponding contacts in a multi-pin receptacle integrated with a luminaire 102. Via this receptacle, AC line source power is brought into the streetlight-based power tap 100b. In these and other embodiments, AC line source power (i.e., utility power, mains power, or the like) may be arranged as a powerline source providing 120 VAC, 208 VAC, 220 VAC, 240 VAC, 260 VAC, 277 VAC, 360 VAC, 415 VAC, 480 VAC, 600 VAC, or some other power source voltage. Circuitry on the power board The optional first processing circuit board 132 may include any one or more of powerline filter circuitry, analog front end circuitry, power level circuitry, power signal modification circuitry, switching power supply circuitry, and power metering circuitry. Such circuitry is arranged to convert the power source voltage mains power to a consumer-level voltage such as 100 VAC, 110 VAC, 120 VAC, 160 VAC, 200 VAC, or some other level of direct current voltage (VDC) or alternating current voltage (VAC). The consumer-level voltage power signal is electrically coupled and thereby made available vie the electrical conduit 106, socket 128 (not shown in FIG. 6 to avoid obfuscating other portions of the figure), or via some other consumer-level power interface of the streetlight-based power tap 100b.

In some embodiments, first power metering circuitry is arranged to measure power characteristics (e.g., voltage, current, power, phase, noise, fluctuation, disturbances, and the like) on a line-side of the mains power, and second power metering circuitry, or a second portion or use of the first power metering circuitry, is arranged to measure power characteristics on a load-side of the mains power. In this manner, power consumption by an electrically powered device 110, and in some cases additional power characteristics of an electrically powered device 110 coupled to the streetlight-based power tap 100b, may be determined.

The second processing circuit board 134, when such board is included, is electrically, communicatively, or electrically and communicatively coupled to the first processing circuit board 132. In some cases, DC power (e.g., 3.3 VDC, 5 VDC, 12 VDC, 48 VDC) is passed from the from the first processing circuit board 132 to the second processing circuit board 134. One or more of the direct current power signals may, for example, be generated by a switching power supply of the first processing circuit board 132. The direct current power signals may be passed via the first coupling structure 138. In these or in other cases, communication signals may also be passed between the first processing circuit board 132 and the second processing circuit board 134 via the second coupling structure 140. In at least some embodiments, communications are facilitated via a gigahertz communication functionality, a serial bus, an optical communications medium, or some other communication means.

In some cases, when so included, the second processing circuit board 134, which may also be called a main board, can include an applications processor, a network switch processor, and at least one network communications port. The applications processor of the main board may implement any number of features for the streetlight-based power tap 100b. For example, data collection by one or more sensors may be controlled by the applications processor, and the applications processor may also control or otherwise direct communications circuits to transmit the generated data, receive data, control user interface features (e.g., pilot lights, audio signals, wiring fault alerts, switch inputs to enable or disable one or more of the consumer-level power interfaces, and the like).

In some cases, one or more electrical conduits 106 are arranged to pass sensor signals, internet of things (IoT) signals, multimedia signals (e.g., cameras or other multimedia devices), weather signals, transducer signals, control signals, or any other type of power and/or signaling data. Such implementation of use of an electrical conduit 106 may be in addition to, or as an alternate to, using the electrical conduit 106 as a consumer-level power interface to pass power to an electrically powered device. By taking advantage of network and other signaling, the applications processor can perform local or system-level processing to control a streetlight luminaire 102 and to control other aspects of the streetlight-based power tap 100b.

An optional third processing circuit board 136, when included in a streetlight-based power tap 100b, may have communication circuits (e.g., cellular radio transceiver, WiFi transceiver, or other wireless or wired communication means). The third processing circuit board 136 may include circuitry to implement the functions of a smart sensor device. In some cases, the third processing circuit board 136 may be arranged to include one or more cellular-based radio chipsets. In other cases, the third processing circuit board 136 may include one or more antennas and support circuits and structures that implement and control wireless (e.g., cellular-based, WiFi-based, and the like) radio functionality.

Optionally, as evident in FIG. 6, conduit 106, one or more sockets 128, or some other consumer-level power interface may be electrically coupled to any one or more of the optional first, second, and third processing circuit boards 132, 134, 136.

Figure 7:
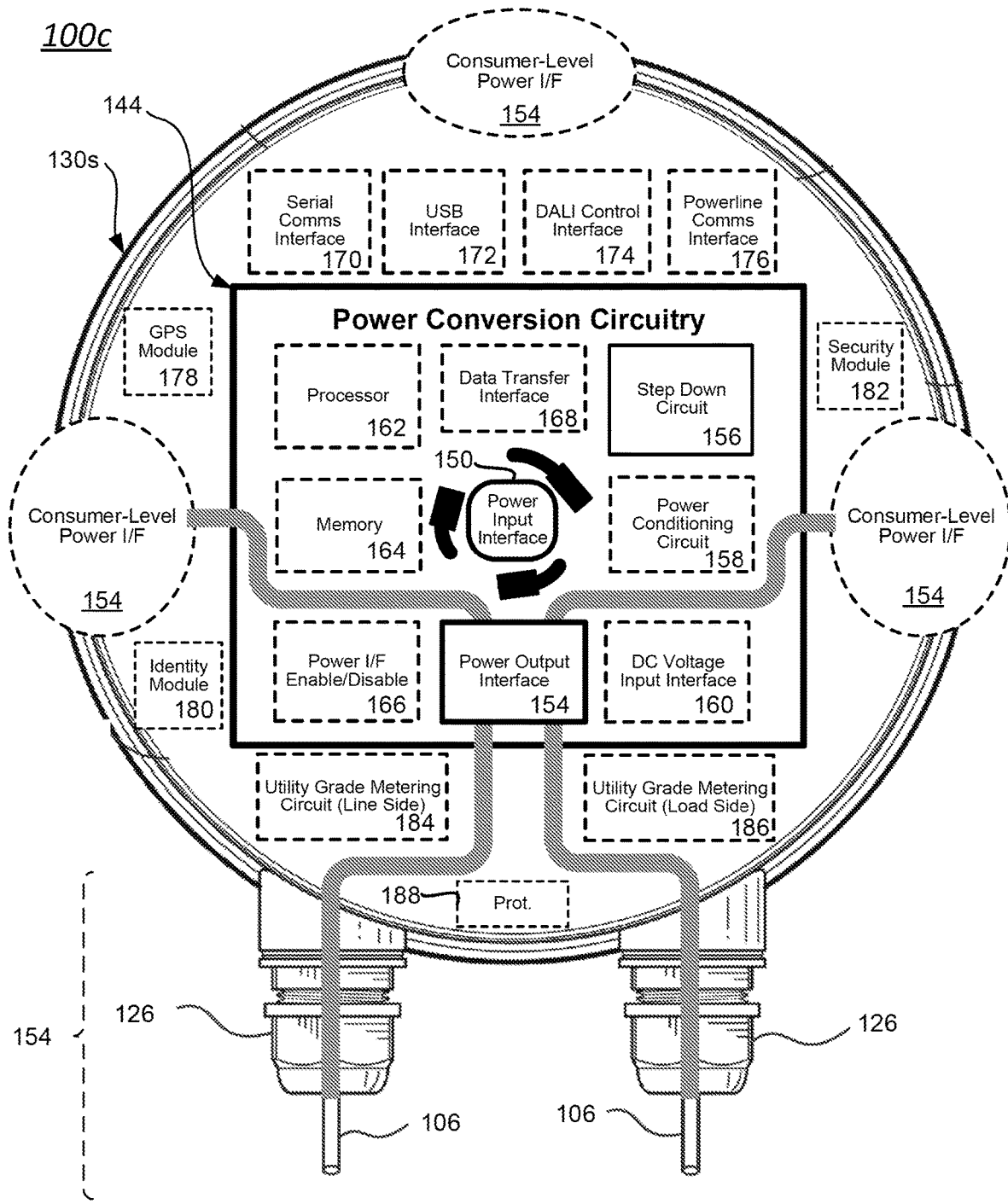
FIG. 7 is a schematic view of a streetlight-based power tap embodiment.

FIG. 7 is a schematic view of a streetlight-based power tap embodiment 100c. The embodiment is illustrated as a top-down view of the power tap looking through a top surface, toward a bottom surface, wherein required and optional circuitry and structures within the housing are represented. A male connector is integrated with a substantially planar portion of the bottom surface, and a female connector is integrated with a substantially planar portion of the top surface of the housing. In FIG. 7, the male and female connectors are illustrated as emboldened profiles of pins and sockets directly on top of each other and not given specific reference numbers because these structures are more clearly shown in a side view of a power tap embodiments such as the multi-pin connector 122 and multi-pin receptacle 124 of FIG. 6. The first male connector has at least three pins arranged for substantially permanent electromechanical coupling to at least three corresponding receptacles of a first female connector that is integrated with a streetlight luminaire, and the at least three pins of the male connector are arranged about a first central axis, which is substantially normal to the substantially planar portion of the bottom surface. The female connector has at least three receptacles arranged to receive at least three corresponding pins of a second male connector that is integrated with an electronic control device. The at least three receptacles of the second female connector are arranged about a second central axis, and the second central axis is substantially normal to the substantially planar portion of the top surface.

The male connectors and female connectors integrated into the housing of the power tap of FIG. 7 are compliant with a roadway area lighting standard promoted by a standards body. Corresponding connectors of a streetlight luminaire, streetlight control device, smart sensor device, and the like are also compliant with the roadway area lighting standard promoted by the standards body. The roadway area lighting standard promoted by the standards body may be an American National Standards Institute (ANSI) C136 standard. The roadway area lighting standard promoted by the standards body may be compliant with, or backwards compatible to, ANSI C136.41-2013. In still other cases, the roadway area lighting standard promoted by the standards body may be a ZHAGA Consortium standard.

Power conversion circuitry 144 is arranged within the housing. Generally, the power conversion circuitry receives a higher voltage input signal and produces at least one lower voltage output signal. A power input circuit 150 electrically couples the first male connector to the power conversion circuitry, and a power output interface 152 is electrically coupled to the power conversion circuitry and arranged to expose the at least one lower voltage output signal. More particularly in the embodiment of FIG. 7, the power input interface 150 is proximate one or both of the male and female connectors integrated into the housing, and the power output interface 152 is electrically couples to one or more optional consumer level power interfaces 154, which may be arranged as sockets 128, pig-tailed, socket-terminated, or plug-terminated electrical conduits 106, or some other power interface means.

The consumer level power interfaces 154 are in some cases arranged as a National Electrical Manufacturers Association (NEMA) Type 1-15 Type-A socket. In these or other cases, a consumer level power interface 154 may be arranged as a NEMA Type 5-15 Type-B socket. In still other cases, consumer level power interfaces 154 may be arranged to receive a British Standard 546 plug, a Type C plug, a Type D plug, a Type E plug, a Type F plug, a Type H plug, a Type J plug, a Type K plug, a Type L plug, a Type M plug, a Type N plug, or a Type O plug. Alternatively, the consumer level power interfaces 154 may include a wire, cable, or other electrical means arranged for field wiring to one or more power consuming devices. In some cases, the consumer level power interface 154 is directly integrated through a sidewall 130s of the housing, and in other cases, the power interface includes or is otherwise associated with a twist lock connector 126, grommet, strain relief, or some other through-wall structure known by those of skill in the art.

The power conversion circuitry 144 of the power tap 100c embodiment includes a step-down circuit 156. The step-down circuit 156 may include any suitable power conversion circuitry that produces, from an input voltage signal, an output voltage signal having different characteristics. For example, the output voltage signal may be a higher voltage, a lower voltage, a signal having a different phase or frequency, or an output signal having some other characteristics that are different from the input voltage signal. For example, in at least one case, the step-down circuit 156 includes at least one step-down transformer circuit. In other cases, the step-down circuit additionally or alternatively includes a step-up transformer circuit. In these or still other cases, the step-down circuit includes an isolation transformer circuit. Using one or more of these, the power conversion circuitry 144 is configured or configurable to generate an output voltage signal that has a lower voltage, a same voltage, or a higher voltage than the input voltage signal.

In some cases, the at least one step-down transformer circuit is statically configurable; in other cases, the at least one step-down transformer circuit is dynamically configurable; and in some cases, the at least one step-down transformer circuit is manually configurable. Sometimes, the at least one step-down transformer circuit is programmatically configurable, and other times, the at least one step-down transformer circuit is remotely configurable. In at least one case, the at least one step-down transformer circuit is configurable to a selected input voltage range, and in at least one case, the at least one step-down transformer circuit is configurable to a selected input voltage. Other configurations are of course contemplated.

Optionally, as described further in the present disclosure, the power conversion circuitry 144 may include any one or more of a power conditioning circuit 158, a direct current (DC) voltage input interface 160, a processor 162, memory 164, a power interface enable/disable module 166, and a data transfer interface 168.

Optionally, as described further in the present disclosure, the housing of the power tap 100c embodiment may include any one or more of a serial communications interface 170, a universal serial bus interface 172, a digital addressable lighting interface (DALI) control interface 174, and a powerline communications interface 176. In these and other cases, one or more of a global positioning system (GPS) module 178, an identity module 180, a security module 182, a line side utility grade metering circuit 184, a load side utility grade metering circuit 186, and a protection circuit 188 are additionally or alternatively integrated or otherwise included or associated with the housing of the power tap 100c. Still other circuits, modules, logic, and the like are included, but not illustrated to avoid unhelpfully cluttering the embodiment illustrated in FIG. 7.

The power conditioning circuitry 158 includes at least one power conditioning circuit. The at least one power conditioning circuit may include circuits, software, or other logic arranged to absorb, divert, or otherwise reduce the effects of power spikes, power transients, or noise, present on the higher voltage input signal. In some cases, the circuitry, is arranged to remove noise from the higher voltage input signal. In these or other cases, the at least one power conditioning circuit is arranged to detect stray voltage, detect short circuits, open circuits, or other improperly wired upstream and downstream circuits. The circuitry may include filters, switches, shunts, buffers, timers, and other active and passive devices.

The circuits of the power tap 100c typically include low power circuits that operate on a direct current (DC) voltage signal. In some cases, the power tap 100c is arranged to produce a useful power signal from power received via the power input interface 150. In these cases, the step-down circuitry 156 generates a lower voltage AC signal, and additional circuitry rectifies and filters the lower voltage AC signal into a DC signal of appropriate characteristics. Additionally or alternatively, a suitable lower power DC voltage may be drawn from the DC voltage input interface 160. In at least some cases, the DC voltage input interface includes one, two, or more dimming contacts of the multi-pin connector 122, multi-pin receptacle 124, or both. In at least one case, the lower power DC voltage is generated in an electronic control device (e.g., a smart sensor device 104) and passed through a pair of dimming contacts into the power tap device 100c for use by the circuits of the power tap device 100c.

In some cases, the power conversion circuitry 144 includes at least one processor 162, at least one memory 164, and other supporting circuits to enable computing operations. The memory 162 may store software instructions executable by the processor 162. In these and other cases, the memory 162 may also be arranged to store parameters used by, generated by, or used by and generated by the software, circuitry, or other logic of the power tap 100c.

A power interface enable/disable module 166 is optionally included in some embodiments of a power tap 100c. Such module, generally speaking, may be used to enable, disable, or enable and disable one power output. More specifically, in some cases, the power interface enable/disable module 166 may be a simple mechanical switch, an electronic switch, a set of switches, or some other device or configuration of devices used to selectably control one or more of the consumer-level power interfaces 154. Such selective control may include turning on a consumer-level power interface 154, turning off a consumer-level power interface 154, turning on or off a consumer-level power interface 154 at will, turning on or off a consumer-level power interface 154 on a schedule, turning on or off a consumer-level power interface 154 directly, turning on or off a consumer-level power interface 154 indirectly, turning on or off a consumer-level power interface 154 locally, turning on or off a consumer-level power interface 154 remotely, turning on or off a consumer-level power interface 154 programmatically, or the like. In any of these cases, control of a consumer-level power interface 154 may include control of some, all, or a certain group of consumer-level power interfaces 154.

The power conversion circuitry 144 will optionally include a data transfer interface 168. The data transfer interface 168 is useful to move parameters, information, or other data, into the power tap 100c, out from the power tap 100c, or into and out from the power tap 100c. The data may include information related to the power signals that pass into, out from, or into and out from the power tap 100c. For example, in some cases, the data may include power consumed by an electrically powered device 110 that is electrically coupled to the power tap 100c. The data may alternatively or additionally include information related to phase, frequency, power spikes, power lags, noise, or other such information. In at least some cases, the data transfer interface 168 is arranged to communicate information through one, two, or more contacts (e.g., line, load, neutral, dimming contacts) of a multi-pin connector 122 or multi-pin receptacle 124 of a particular power tap. In other cases, the data transfer interface 168 is arranged to communicate information wirelessly such as via one or more of an infrared light-based communications protocol, a radio frequency (RF) protocol, WiFi-based protocol, cellular communications protocol, a BLUETOOTH protocol, or some other wireless protocol and the associated logic to enable such protocol.

The data transfer interface 168 may pass information through any viable communications medium available in or otherwise associated with a particular power tap. To assist with such data transfer, the power tap may optionally include one or more of a serial communications interface 170, a universal serial bus (USB) interface 172, a digital addressable lighting interface (DALI) control interface 174, a powerline communications interface 176, or some other interface. Alternatively, in some cases, a power tap has an absence of any communications whatsoever. When so included, however, the data transfer interface 168 may use any suitable communications medium and protocol to pass data via the one, two, or more contacts.

The optional data transfer interface 168 may in some cases be arranged as a wired or wireless high-speed data transfer interface. In some embodiments, for example, the optional data transfer interface 168 is arranged to form or otherwise communicate streaming digital data, packetized digital data, or some other form of data. That is, in any number of zero or more cases, data in the optional data transfer interface 168 may be accumulated, buffered, serialized, parallelized, packetized, or formatted in any suitable manner.

In at least one embodiment, an input, output, or input and output to the data transfer interface 168 is coupled to one of a plurality (e.g., one of a pair, one of three, one of many) of RF-coupled or near-field electromagnetic induction-coupled elements. In at least one embodiment, the input to the data transfer interface 168 is coupled to one of a plurality (e.g., one of a pair, one of three, one of many) of electromagnetically-coupled (e.g., inductive) elements.

In at least one embodiment, an input, output, or input and output of the data transfer interface 168 is coupled to one or more conduits (e.g., a light-based conduit such as a fiber-optic cable, a twisted pair of wire, and the like).

In at least one embodiment, the high speed data connection between two corresponding data communication elements that is enabled by the optional data transfer interface 168 is capable of achieving uni-directional or bi-directional data rates of 500 megabits-per-second (500 Mbps), one gigabit per second (1 Gbps), two gigabits per second (2 Gbps), four gigabits per second (4 Gbps), six gigabits per second (6 Gbps), ten gigabits per second (10 Gbps), or some other even greater data rate. Slower data rates are also contemplated, and the parameters of such communications are programmatically configurable in at least some embodiments.

In at least some cases, data communication elements enabled by the data transfer interface 168 may communicate according to a fixed or dynamically programmable universal serial bus (USB) SuperSpeed protocol, a DisplayPort protocol, a serial ATA (SATA) protocol, a peripheral component interconnect express (PCIe) protocol, a V-by-One protocol, an Ethernet protocol, a universal asynchronous receiver transmitter (UART) protocol, a general purpose input/output (GPIO) customized protocol, and a serial peripheral interconnect (SPI) protocol. Other protocols are of course contemplated.

In some cases, the power tap 100c is uniquely identified in the world, or in a system of electronic devices such as within a plurality of streetlights, a set of power poles, a city, a municipality, a county, a region, a state, a country, or in some other geographical area or area organized in a different way. To accomplish such identification, the power tap 100c may optionally include a global positioning system (GPS) module 178 (e.g., a GPS chipset) or some other identity module 180. When a GPS chipset is included, the power tap 100c may be identified by its unique geographic location in the world. The identity module 180 may present the unique identity of the power tap 100c via a global or systemwide media access controller (MAC) address, a serialized number, a random number, a bar code, a quick-read (QR) code, or some other type of identifying means.

A security module 182, when included in a power tap 100c, is arranged to secure data that is generated by the power tap 100c or otherwise passed into or out from the power tap 100c. In at least some cases, data secured by the security module 182 resides only in the power tap 100c. In at least some cases, the security module 182 includes encryption resources, decryption resources, obfuscation resources, randomization resources, and the like.

The power tap 100c may include a line side utility grade metering circuit 184, a load side utility grade metering circuit 186, or both. In at least some cases, the metering circuit or circuits are useful for determining how much power is consumed in any or all of the electrically powered devices 110 coupled to a power tap. When the metering circuitry is used in combination a suitable power interface enable/disable module 166, power individually consumed by a plurality of electrically powered devices 110 may be determined. Data generated, captured, or otherwise determined by the metering circuitry may be encrypted or otherwise protected with a security module 182. Such data may be passed from the power tap 100c device via the data transfer interface 168. In at least one case, the data determined by the metering circuitry is passed through a set of dimming contacts via a communication interface (e.g., a serial communications interface 170, a DALI control interface 174, or the like), into an electronic control device such as a smart sensor device 104. The smart sensor device 104 may then send individual, aggregated, or otherwise consolidated data, along with suitable metadata that identifies the data's source, to a remote device such as a remote computing server.

In at least one case, the power tap 100c includes one or more protection circuits 188. Such a protection circuit may include at least one fuse, at least one manually resettable circuit breaker, at least one remotely resettable circuit breaker, at least one programmatically resettable circuit breaker, or some other protection circuit. The protection circuit 188 may be used to mitigate the effect of a short circuit, an open circuit, an overloaded circuit, or the like.

For the avoidance of doubt, any features, structures, or other logic associated in the present disclosure with the power tap 100c may also be associated with any other power tap described herein and vice versa.

FIGS. 8A-8F are streetlight-based power tap housing embodiments 130c-130k. In the present disclosure, FIGS. 8A-8F may be collectively referred to as FIG. 8. Structures earlier identified are not repeated for brevity.

In FIG. 8A, four different top-down view embodiments are shown illustrating that a power-tap housing may have any suitable profile shape including a square shape 130c, an octagon shape 130d, a decagon shape 130e and a circular shape 130f. In FIG. 8B, a certain streetlight-based power tap has a disc-shaped housing 130g, which may also be referred to as a cylinder-shape, a puck-shape, or some other name. A lens-shaped housing 130h as depicted in FIG. 8C may be used to expose consumer-level power interface embodiments on a bottom surface that is implicitly shielded from rain and snow. A rectangular-shaped housing 130i is represented in FIG. 8D, a hexagonal-shaped housing 130j is represented in FIG. 8E, and a triangular-shaped housing 130k is depicted in FIG. 8F.

As particularly evident in FIGS. 8A-8F, many housing shapes, profiles, cross-sections, and housings with other physical attributes are considered. In fact, a housing for a streetlight-based power tap as presented in this disclosure may have any suitable shape, size, material, and the like. In some cases, for example, a power tap housing has a substantially circular top-down profile that is between about two inches (2 in.) and about ten inches (10 in.) in diameter. In at least one case, the housing has a substantially circular top-down profile that is about three inches (3 in.) in diameter. In some of these cases, the housing has a height of between about one-quarter inch (0.25 in.) and about six inches (6 in.). In at least one case, such as in the embodiment of FIG. 8B, a side surface has a height of between about one hundredth of an inch (0.01 in.) and about three inches (3 in.), and in the embodiment of FIG. 8C, a size surface transitions from a first height (e.g., a height between about 0.01 in. and about 0.75 in.) and a second height (e.g., a height between about 0.75 in. and about 3 in.). In some cases, a size of a suitable streetlight-based power tap housing is expressed as a surface area. For example, in some cases, a bottom surface of a housing has an area of between about four square inches (4 in$^2$.) and about thirty-six square inches (36 in$^2$.). And along these lines, a suitable streetlight-based power tap housing may be expressed in terms of volume such a power tap housing having a volume of between about 3 cubic inches (3 in$^3$.) and about 350 cubic inches (350 in$^3$.). Other dimensions are contemplated.

Figure 9:
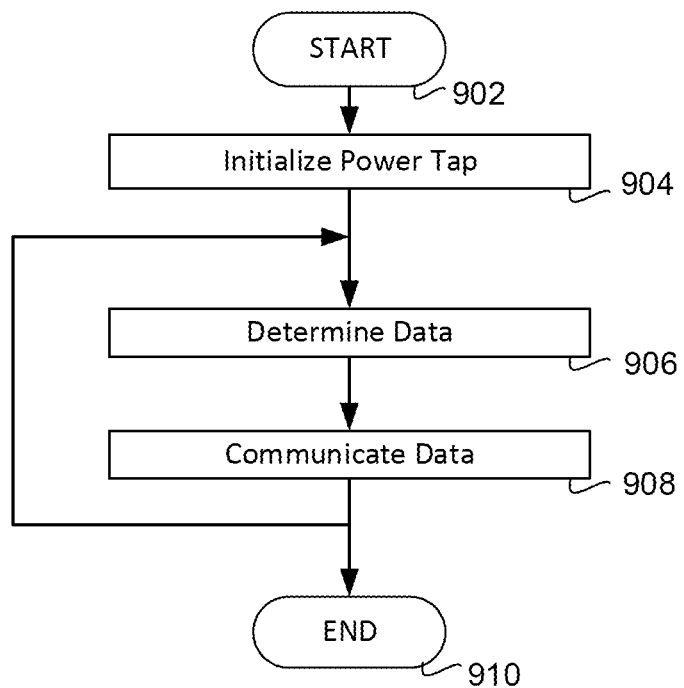
FIG. 9 is a data flow diagram of operations in a streetlight-based power tap.

FIG. 9 is a data flow diagram of operations in a streetlight-based power tap 900. The operations may be performed in any of the streetlight-based power taps illustrated and described in the present disclosure. In such cases, the operations may be carried out with discrete electronic components, with a field programmable gate array (FPGA), a processor, or some other type of state machine or computing device. Processing begins at 902.

At 904, the power data is initialized. Such initialization may include software-based initialization that includes loading parameters, instantiating communications, and the like. In other cases, initialization includes hardware initialization such as rectifying power, stabilizing filter circuitry, and the like. In some cases, both hardware and software initialization occurs at 904. Processing advances to 906.

At 906, certain data is determined. In at least some cases, determining data includes retrieving data from one or more utility-grade metering circuits 184, 186 (FIG. 7). In these or other cases, data may be determined from a security module 182 (FIG. 7), or other sensors. Determining data may include determining whether or not one or more consumer-level power interfaces 154 (FIG. 7) is enabled and disabled. The determination of any other data associated with a power tap is of course contemplated.

At 908, data is communicated by, from, or by and from the power tap. Communication of data may be through a data transfer interface 168 (FIG. 7), a communications interface (e.g., a serial communications interface 170, a USB interface 172, a DALI control interface 174, a powerline communications interface 176 of FIG. 7), or some other interface.

Processing may end at 910. Alternatively, processing may return to 906 where additional data is collected, received, generated, processed, analyzed, or determined in some other way.

Having now set forth certain embodiments, further clarification of certain terms used herein may be helpful to providing a more complete understanding of that which is considered inventive in the present disclosure.

FIG. 9 includes a data flow diagram illustrating a non-limiting process that may be used by embodiments of a streetlight-based power tap 100. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing device embodiments such as one or more components of a streetlight-based power tap 100, a remote computing device, and the like. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

When so arranged as described herein, each computing device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

At least some of the embodiments described herein use computerized technology to improve the technology of power taps, but other techniques and tools remain available to pass data to and from streetlight-based devices. Therefore, the claimed subject matter does not foreclose the whole or even substantial streetlight-based power tap technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific streetlight-based power tap system features claimed herein. The embodiments described in the present disclosure improve upon known streetlight-based processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform streetlight-based power tap operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the streetlight-based power tap systems described herein, may be formed in a single database or multiple databases. In some cases hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electromechanical (MEMS) devices such as accelerometers, and the like.

In at least one embodiment, devices such as the power tap 100 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the streetlight-based power tap. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of a power tap system.

Buttons, keypads, computer mice, memory cards, serial ports, bio-sensor readers, touch screens, and the like may individually or in cooperation be useful to a user operating the streetlight-based power tap system. The devices may, for example, input control information into the system. Displays, printers, memory cards, LED indicators, temperature sensors, audio devices (e.g., speakers, piezo device, etc.), vibrators, and the like are all useful to present output information to the user operating the streetlight-based power tap system. In some cases, the input and output devices are directly coupled to the streetlight-based power tap and electronically coupled to a processor or other operative circuitry. In other cases, the input and output devices pass information via one or more communication ports (e.g., RS-232, RS-485, infrared, USB, etc.).

The term "high speed data connection," as used in the present disclosure includes data connections arranged to pass data at a rate of at least one million bits per second (1 Mbps). A high speed data connection does not need to achieve such a data rate in all uses, but the high speed data connections described in the present disclosure are arranged to pass data at such speeds if so configured. For the avoidance of doubt, high speed data connections of the present disclosure include, but are not limited to, connections used to pass data according to rates compatible with an Ethernet standard (e.g., 100 Mbps), an IEEE 802.11g WiFi standard (e.g., 54 Mbps), an IEEE 802.11n WiFi standard (e.g., 150 Mbps, 300 Mbps, and higher), a digital subscriber line (DSL) standard (e.g., 3 Mbps to 50 Mbps), a serial digital interface (SDI) standard (e.g., 270 Mbps to 540 Mbps), a Gigabit Ethernet standard (e.g., 1 Gbps), and a Terabit standard (e.g., 1000 Gbps), a 3G backhaul communications standard, a 4G backhaul communications standard, or a 5G backhaul communications standard.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days)] or that occurs based on intervention or direction by a person or other activity. An example of an activity that is not real-time is one that occurs over an extended period of time (e.g., hours or days) or that occurs based on intervention or direction by a user or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a sidewall of a streetlight-based power tap may be described as being formed or otherwise oriented "substantially vertical," In these cases, a sidewall that is oriented exactly vertical is oriented along a "Z" axis that is normal (i.e., 90 degrees or at right angle) to a plane formed by an "X" axis and a "Y" axis. Different from the exact precision of the term, "vertical," the use of "substantially" to modify the characteristic permits a variance of the "vertical" characteristic by up to 30 percent. Accordingly, a sidewall that is oriented "substantially vertical" includes sidewalls oriented between 63 degrees and 117 degrees. A sidewall that is oriented at 45 degrees of an X-Y plane, however, is not mounted "substantially vertical." As another example, a streetlight-based power tap housing having a particular linear dimension of "between about three (3) inches and ten (10) inches" includes such devices in which the linear dimension varies by up to 30 percent, Accordingly, the particular linear dimension of the streetlight-based power tap housing may be between one and one-half (1.5) inches and thirteen (13) inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements; however, these elements are not to be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity, as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The streetlight-based power taps described in the present disclosure provide several technical effects and advances to the field of smart city infrastructure.

Technical effects and benefits include the ability to quickly and efficiently provide temporary or permanent power for lights, sound equipment, multimedia, advertising, safety equipment, test equipment, and nearly any system, device, or other structure that requires electrical power. In at least some cases, the power taps may also improve the reliability and safety of the city, county, municipality, state, or regional power grid by monitoring and metering the line side power infrastructure, the load side power infrastructure or, concurrently, the line side and load side power infrastructure at a streetlight. Such monitoring and metering can be performed in real time, and information collected during such monitoring and metering may be communicated back to a remote computing server in real time, or at a time subsequent.

The present disclosure sets forth details of various structural embodiments that may be arranged to carry out the teaching of the present disclosure. By taking advantage of the flexible circuitry, mechanical structures, computing architecture, and communications means described herein, a number of exemplary devices and systems are now disclosed.

Example A-1 is a power tap, comprising: a housing having a top surface, a bottom surface, and at least one side surface; a first male connector is integrated with a substantially planar portion of the bottom surface, and the first male connector has at least three pins arranged for substantially permanent electromechanical coupling to at least three corresponding receptacles of a first female connector that is integrated with a streetlight luminaire. At least three pins of the first male connector are arranged about a first central axis, and the first central axis is substantially normal to the substantially planar portion of the bottom surface. A second female connector is integrated with a substantially planar portion of the top surface of the housing, and the second female connector has at least three receptacles arranged to receive at least three corresponding pins of a second male connector that is integrated with an electronic control device. The at least three receptacles of the second female connector are arranged about a second central axis, and the second central axis is substantially normal to the substantially planar portion of the top surface. Each male connector and each female connector is compliant with a roadway area lighting standard promoted by a standards body. Power conversion circuitry is arranged within the housing to receive a higher voltage input signal and to produce at least one lower voltage output signal. A power input circuit electrically couples the first male connector to the power conversion circuitry; and a power output interface is electrically coupled to the power conversion circuitry and arranged to expose the at least one lower voltage output signal.

Example A-2 may include the subject matter of Example A-1, and alternatively or additionally any other example herein, wherein the housing has a substantially circular top-down profile that is between about two inches (2 in.) and about ten inches (10 in.) in diameter.

Example A-3 may include the subject matter of Example A-2, and alternatively or additionally any other example herein, wherein the housing has a substantially circular top-down profile that is about three inches (3 in.) in diameter.

Example A-4 may include the subject matter of Example A-3, and alternatively or additionally any other example herein, wherein the housing is between about one-quarter inch (0.25 in.) and about six inches (6 in.) in height.

Example A-5 may include the subject matter of Example A-4, and alternatively or additionally any other example herein, wherein the housing is formed, at least in part, from a plastic material.

Example A-6 may include the subject matter of Example A-5, and alternatively or additionally any other example herein, wherein the housing is formed, at least in part, from a metal.

Example A-7 may include the subject matter of Example A-6, and alternatively or additionally any other example herein, wherein the housing is formed, at least in part, from a glass-filled material.

Example A-8 may include the subject matter of any of Examples A-1 to A-7, and alternatively or additionally any other example herein, wherein the side surface has a height of between about one hundredth of an inch (0.01 in.) and about three inches (3 in.).

Example A-9 may include the subject matter of any of Examples A-1 to A-8, and alternatively or additionally any other example herein, wherein the housing has a generally circular top-down profile.

Example A-10 may include the subject matter of any of Examples A-1 to A-9, and alternatively or additionally any other example herein, wherein the housing has a generally puck-shaped appearance.

Example A-11 may include the subject matter of any of Examples A-1 to A-10, and alternatively or additionally any other example herein, wherein the housing has a generally disc-shaped appearance.

Example A-12 may include the subject matter of any of Examples A-1 to A-11, and alternatively or additionally any other example herein, wherein the housing has a generally rectangular shaped appearance.

Example A-13 may include the subject matter of any of Examples A-1 to A-12, and alternatively or additionally any other example herein, wherein the housing has a generally triangular shaped appearance.

Example A-14 may include the subject matter of any of Examples A-1 to A-13, and alternatively or additionally any other example herein, wherein the bottom surface of the housing has an area of between about four square inches (4 $in^2$.) and about thirty-six square inches (36 $in^2$.).

Example A-15 may include the subject matter of any of Examples A-1 to A-14, and alternatively or additionally any other example herein, wherein the substantially permanent electromechanical coupling is between structures that are rotatably coupled, laterally coupled, one-dimensionally coupled, multi-dimensionally coupled, magnetically coupled, clamped, screwed, or bracketed.

Example A-16 may include the subject matter of any of Examples A-1 to A-15, and alternatively or additionally any other example herein, wherein the electronic control device is a single purpose streetlight controller having an absence of any communication circuits.

Example A-17 may include the subject matter of any of Examples A-1 to A-16, and alternatively or additionally any other example herein, wherein the electronic control device is a smart streetlight controller having at least one transmitter capable of communicating information received from the power tap to a remote computing server.

Example A-18 may include the subject matter of any of Examples A-1 to A-17, and alternatively or additionally any other example herein, wherein the electronic control device is a smart streetlight controller having a cellular communication transceiver.

Example A-19 may include the subject matter of any of Examples A-1 to A-18, and alternatively or additionally any other example herein, wherein the electronic control device has at least one of a camera, a microphone, and an access point compliant with at least one IEEE 802.11 protocol.

Example A-20 may include the subject matter of any of Examples A-1 to A-19, and alternatively or additionally any other example herein, wherein the roadway area lighting standard promoted by the standards body is an American National Standards Institute (ANSI) C136 standard.

Example A-21 may include the subject matter of any of Examples A-1 to A-20, and alternatively or additionally any other example herein, wherein the roadway area lighting standard promoted by the standards body is compliant with, or backwards compatible to, ANSI C136.41-2013.

Example A-22 may include the subject matter of any of Examples A-1 to A-21, and alternatively or additionally any other example herein, wherein the roadway area lighting standard promoted by the standards body is a ZHAGA Consortium standard.

Example A-23 may include the subject matter of any of Examples A-1 to A-22, and alternatively or additionally any other example herein, wherein the power conversion circuitry includes at least one fuse.

Example A-24 may include the subject matter of any of Examples A-1 to A-23, and alternatively or additionally any other example herein, wherein the power conversion circuitry includes at least one manually resettable circuit breaker.

Example A-25 may include the subject matter of any of Examples A-1 to A-24, and alternatively or additionally any other example herein, wherein the power conversion circuitry includes at least one remotely resettable circuit breaker.

Example A-26 may include the subject matter of any of Examples A-1 to A-25, and alternatively or additionally any other example herein, wherein the power conversion circuitry includes at least one programmatically resettable circuit breaker.

Example A-27 may include the subject matter of any of Examples A-1 to A-26, and alternatively or additionally any other example herein, wherein the power conversion circuitry includes at least one interface arranged to pass data signals between the power tap and the electronic control device.

Example A-28 may include the subject matter of any of Examples A-1 to A-27, and alternatively or additionally any other example herein, wherein the at least one interface passes signals that conform with a digital addressable lighting interface (DALI) protocol.

Example A-29 may include the subject matter of any of Examples A-1 to A-28, and alternatively or additionally any other example herein, wherein the at least one interface passes signals that conform with a serial protocol.

Example A-30 may include the subject matter of any of Examples A-1 to A-29, and alternatively or additionally any other example herein, wherein the at least one interface passes signals that conform with a universal serial bus (USB) protocol.

Example A-31 may include the subject matter of any of Examples A-1 to A-30, and alternatively or additionally any other example herein, wherein the at least one interface passes signals that conform with a powerline communications protocol.

Example A-32 may include the subject matter of any of Examples A-1 to A-31, and alternatively or additionally any other example herein, wherein the at least one interface passes signals that conform with a wireless data communications protocol including one or more of an infrared light-based communications protocol, a radio frequency (RF) protocol, WiFi-based protocol, cellular communications protocol, and a BLUETOOTH protocol.

Example A-33 may include the subject matter of any of Examples A-1 to A-32, and alternatively or additionally any other example herein, wherein the power conversion circuitry includes at least one interface arranged to pass direct current (DC) power to the power tap from the electronic control device.

Example A-34 may include the subject matter of any of Examples A-1 to A-33, and alternatively or additionally any other example herein, wherein the higher voltage input signal is an alternating current (AC) signal at a first voltage and the lower voltage output signal is an AC signal at a second voltage, the second voltage being lower than the first voltage.

Example A-35 may include the subject matter of any of Examples A-1 to A-34, and alternatively or additionally any other example herein, wherein the higher voltage input signal is between about 220 VAC and about 600 VAC.

Example A-36 may include the subject matter of any of Examples A-1 to A-35, and alternatively or additionally any other example herein, wherein the lower voltage output signal is between about 95 VAC and about 130 VAC.

Example A-37 may include the subject matter of any of Examples A-1 to A-36, and alternatively or additionally any other example herein, wherein the lower voltage output signal is about 120 VAC.

Example A-38 may include the subject matter of any of Examples A-1 to A-37, and alternatively or additionally any other example herein, wherein the power conversion circuitry includes at least one utility-grade power metering circuit; and at least one communication circuit arranged to communicate information generated by the at least one utility-grade power metering circuit.

Example A-39 may include the subject matter of any of Examples A-1 to A-38, and alternatively or additionally any other example herein, wherein the information generated by the at least one utility-grade power metering circuit includes first power information associated with an incoming power line to the streetlight luminaire and second power information associated with at least one of: power consumed by the luminaire, power consumed by the electronic control device, and power consumed by a device plugged into the power tap.

Example A-40 may include the subject matter of any of Examples A-1 to A-39, and alternatively or additionally any other example herein, wherein the at least one utility-grade power metering circuit includes a line-side power metering circuit, a load-side power metering circuit, or a line-side power metering circuit and a load-side power metering circuit.

Example A-41 may include the subject matter of any of Examples A-1 to A-40, and alternatively or additionally any other example herein, wherein the at least one utility-grade power metering circuit includes at least one circuit powered by a direct current (DC) voltage signal.

Example A-42 may include the subject matter of any of Examples A-1 to A-41, and alternatively or additionally any other example herein, wherein the line-side power metering circuit and the load-side power metering circuit operate concurrently.

Example A-43 may include the subject matter of any of Examples A-1 to A-42, and alternatively or additionally any other example herein, wherein the line-side power metering circuit and the load-side power metering circuit operate in real time.

Example A-44 may include the subject matter of any of Examples A-1 to A-43, and alternatively or additionally any other example herein, wherein the communication circuit is arranged to receive power from the electronic control device.

Example A-45 may include the subject matter of any of Examples A-1 to A-44, and alternatively or additionally any other example herein, wherein the communication circuit is a wireless communication circuit including one or more of an infrared light-based communications protocol, a radio frequency (RF) protocol, WiFi-based protocol, cellular communications protocol, and a BLUETOOTH protocol.

Example A-46 may include the subject matter of any of Examples A-1 to A-45, and alternatively or additionally any other example herein, wherein the communication circuit is a wired communication circuit including one or more of a serial communication protocol, a universal serial bus (USB) protocol, and an Ethernet protocol.

Example A-47 may include the subject matter of any of Examples A-1 to A-46, and alternatively or additionally any other example herein, wherein the communication circuit passes information via a set of dimming pins arranged in the second female connector and the second male connector.

Example A-48 may include the subject matter of any of Examples A-1 to A-47, and alternatively or additionally any other example herein, wherein the communication circuit passes information via a DALI communications circuit.

Example A-49 may include the subject matter of any of Examples A-1 to A-48, and alternatively or additionally any other example herein, wherein the communication circuit is a high speed communications data element.

Example A-50 may include the subject matter of any of Examples A-1 to A-49, and alternatively or additionally any other example herein, wherein the power conversion circuitry includes at least one processor and at least one memory arranged to store processor-executable instructions.

Example A-51 may include the subject matter of any of Examples A-1 to A-50, and alternatively or additionally any other example herein, wherein the power conversion circuitry includes at least one memory arranged to temporarily store information collected by the at least one utility-grade power metering circuit.

Example A-52 may include the subject matter of any of Examples A-1 to A-51, and alternatively or additionally any other example herein, wherein the power conversion circuitry includes at least one step-down transformer circuit.

Example A-53 may include the subject matter of any of Examples A-1 to A-52, and alternatively or additionally any other example herein, wherein the at least one step-down transformer circuit is statically configurable.

Example A-54 may include the subject matter of any of Examples A-1 to A-53, and alternatively or additionally any other example herein, wherein the at least one step-down transformer circuit is dynamically configurable.

Example A-55 may include the subject matter of any of Examples A-1 to A-54, and alternatively or additionally any other example herein, wherein the at least one step-down transformer circuit is manually configurable.

Example A-56 may include the subject matter of any of Examples A-1 to A-55, and alternatively or additionally any other example herein, wherein the at least one step-down transformer circuit is programmatically configurable.

Example A-57 may include the subject matter of any of Examples A-1 to A-56, and alternatively or additionally any other example herein, wherein the at least one step-down transformer circuit is remotely configurable.

Example A-58 may include the subject matter of any of Examples A-1 to A-57, and alternatively or additionally any other example herein, wherein the at least one step-down transformer circuit is configurable to a selected input voltage range.

Example A-59 may include the subject matter of any of Examples A-1 to A-58, and alternatively or additionally any other example herein, wherein the at least one step-down transformer circuit is configurable to a selected input voltage.

Example A-60 may include the subject matter of any of Examples A-1 to A-59, and alternatively or additionally any other example herein, wherein the power conversion circuitry includes at least one power conditioning circuit.

Example A-61 may include the subject matter of any of Examples A-1 to A-60, and alternatively or additionally any other example herein, wherein the at least one power conditioning circuit includes at least one circuit arranged to absorb, divert, or otherwise reduce the effects of power spikes present on the higher voltage input signal.

Example A-62 may include the subject matter of any of Examples A-1 to A-61, and alternatively or additionally any other example herein, wherein the at least one power conditioning circuit includes at least one circuit arranged to absorb, divert, or otherwise reduce the effects of power transients present on the higher voltage input signal.

Example A-63 may include the subject matter of any of Examples A-1 to A-62, and alternatively or additionally any other example herein, wherein the at least one power conditioning circuit includes at least one circuit arranged to absorb, divert, or otherwise reduce the effects of noise present on the higher voltage input signal.

Example A-64 may include the subject matter of any of Examples A-1 to A-63, and alternatively or additionally any other example herein, wherein the at least one power conditioning circuit includes at least one circuit arranged to remove noise from the higher voltage input signal.

Example A-65 may include the subject matter of any of Examples A-1 to A-64, and alternatively or additionally any other example herein, wherein the at least one power conditioning circuit includes at least one circuit arranged to detect stray voltage.

Example A-66 may include the subject matter of any of Examples A-1 to A-65, and alternatively or additionally any other example herein, wherein the at least one power conditioning circuit includes at least one circuit arranged to detect a short circuit.

Example A-67 may include the subject matter of any of Examples A-1 to A-66, and alternatively or additionally any other example herein, wherein the at least one power conditioning circuit includes at least one circuit arranged to detect an improperly wired downstream circuit.

Example A-68 may include the subject matter of any of Examples A-1 to A-67, and alternatively or additionally any other example herein, wherein the power conversion circuitry is arranged to produce a plurality of lower voltage output signals.

Example A-69 may include the subject matter of any of Examples A-1 to A-68, and alternatively or additionally any other example herein, wherein the power conversion circuitry is arranged to produce a plurality of lower voltage output signals concurrently.

Example A-70 may include the subject matter of any of Examples A-1 to A-69, and alternatively or additionally any other example herein, wherein the power input circuit includes at least one pass-through circuit that electrically couples each electrical contact of the first female connector to each electrical contact of the second female connector.

Example A-71 may include the subject matter of any of Examples A-1 to A-70, and alternatively or additionally any other example herein, wherein the at least one pass-through circuit includes three electrical conduits, the three electrical conduits arranged to pass, respectively, a line voltage signal, a load voltage signal, and a neutral signal.

Example A-72 may include the subject matter of any of Examples A-1 to A-71, and alternatively or additionally any other example herein, wherein the at least one pass-through circuit includes exactly three electrical conduits, the three electrical conduits arranged to pass, respectively, a line voltage signal, a load voltage signal, and a neutral signal.

Example A-73 may include the subject matter of any of Examples A-1 to A-72, and alternatively or additionally any other example herein, wherein the three electrical conduits include a black jacketed wire arranged to carry a line voltage signal, a red jacketed wire arranged to carry a load voltage signal, and a white jacketed wire arranged to carry a neutral signal.

Example A-74 may include the subject matter of any of Examples A-1 to A-73, and alternatively or additionally any other example herein, wherein the at least one pass-through circuit includes five electrical conduits, the five electrical conduits arranged to pass, respectively, a line voltage signal, a load voltage signal, a neutral signal, a first dimming control signal, and a second dimming control signal.

Example A-75 may include the subject matter of any of Examples A-1 to A-74, and alternatively or additionally any other example herein, wherein the at least one pass-through circuit includes exactly five electrical conduits, the five electrical conduits arranged to pass, respectively, a line voltage signal, a load voltage signal, a neutral signal, a first dimming control signal, and a second dimming control signal.

Example A-76 may include the subject matter of any of Examples A-1 to A-75, and alternatively or additionally any other example herein, wherein the five electrical conduits include a black jacketed wire arranged to carry a line voltage signal, a red jacketed wire arranged to carry a load voltage signal, a white jacketed wire arranged to carry a neutral signal, a violet jacketed wire arranged to carry a first dimming control signal, and an orange-jacketed wire arranged to carry a second dimming control signal.

Example A-77 may include the subject matter of any of Examples A-1 to A-76, and alternatively or additionally any other example herein, wherein the first and second dimming control signals are a zero volts direct current (0 VDC) to ten volts direct current (10 VDC) variable voltage signal.

Example A-78 may include the subject matter of any of Examples A-1 to A-77, and alternatively or additionally any other example herein, wherein the first and second dimming control signals are differential voltage signals.

Example A-79 may include the subject matter of any of Examples A-1 to A-78, and alternatively or additionally any other example herein, wherein the at least one pass-through circuit includes seven electrical conduits, the seven electrical conduits arranged to pass, respectively, a line voltage signal, a load voltage signal, a neutral signal, a first dimming control signal, a second dimming control signal, a third dimming control signal, and a fourth dimming control signal.

Example A-80 may include the subject matter of any of Examples A-1 to A-79, and alternatively or additionally any other example herein, wherein the at least one pass-through circuit includes exactly seven electrical conduits, the seven electrical conduits arranged to pass, respectively, a line voltage signal, a load voltage signal, a neutral signal, a first dimming control signal, a second dimming control signal, a third dimming control signal, and a fourth dimming control signal.

Example A-81 may include the subject matter of any of Examples A-1 to A-80, and alternatively or additionally any other example herein, wherein the seven electrical conduits include a black jacketed wire arranged to carry a line voltage signal, a red jacketed wire arranged to carry a load voltage signal, a white jacketed wire arranged to carry a neutral signal, a violet jacketed wire arranged to carry a first dimming control signal, an orange-jacketed wire arranged to carry a second dimming control signal, a brown-jacketed wire arranged to carry a third dimming control signal, and a grey-jacketed wire arranged to carry a fourth dimming control signal.

Example A-82 may include the subject matter of any of Examples A-1 to A-81, and alternatively or additionally any other example herein, wherein the power output interface includes a socket arranged to receive a plug of a power-consuming device;

Example A-83 may include the subject matter of any of Examples A-1 to A-82, and alternatively or additionally any other example herein, wherein the power output interface includes a plurality of sockets each arranged to receive a plug of a respective power-consuming device;

Example A-84 may include the subject matter of any of Examples A-1 to A-83, and alternatively or additionally any other example herein, wherein each socket is a National Electrical Manufacturers Association (NEMA) Type 1-15 Type-A socket.

Example A-85 may include the subject matter of any of Examples A-1 to A-84, and alternatively or additionally any other example herein, wherein each socket is a NEMA Type 5-15 Type-B socket.

Example A-86 may include the subject matter of any of Examples A-1 to A-85, and alternatively or additionally any other example herein, wherein each socket is arranged to receive a British Standard 546 plug, a Type C plug, a Type D plug, a Type E plug, a Type F plug, a Type H plug, a Type J plug, a Type K plug, a Type L plug, a Type M plug, a Type N plug, or a Type O plug.

Example A-87 may include the subject matter of any of Examples A-1 to A-86, and alternatively or additionally any other example herein, wherein the power output interface includes a wire arranged for field wiring to the power consuming device.

Example A-88 may include the subject matter of any of Examples A-1 to A-87, and alternatively or additionally any other example herein, wherein the power output interface includes a plurality of wires arranged for field wiring to a respective plurality of power consuming devices.

Example A-89 may include the subject matter of any of Examples A-1 to A-88, and alternatively or additionally any other example herein, wherein the power output interface includes at least one switch to enable and disable at least one power output.

Example A-90 may include the subject matter of any of Examples A-1 to A-89, and alternatively or additionally any other example herein, wherein the power output interface includes a plurality of switches, each switch arranged to enable and disable at least one power output.

Example A-91 may include the subject matter of any of Examples A-1 to A-90, and alternatively or additionally any other example herein, wherein each switch is a manually operated switch.

Example A-92 may include the subject matter of any of Examples A-1 to A-91, and alternatively or additionally any other example herein, wherein each switch is a programmatically operated switch.

Example A-93 may include the subject matter of any of Examples A-1 to A-92, and alternatively or additionally any other example herein, wherein each switch is a remotely operated switch.

Example B-1 is a method of providing power at a streetlight, comprising: exposing a socket of a streetlight luminaire, the socket compliant with a roadway area lighting standard promoted by a standards body; electromechanically coupling a power tap to the socket, the power tap including a first male connector having at least three pins participating in the electromechanical coupling of the power tap to the socket; providing a higher voltage input signal electrically tapped from the first male connector to power conversion circuitry of the power tap; producing, with power conversion circuitry, a lower voltage output signal from the higher voltage input signal; providing the lower voltage output signal via an output power interface; and consuming at least some of the lower voltage output signal with a device electrically coupled to the output power interface.

Example B-2 may include the subject matter of Example B-1, and alternatively or additionally any other example herein, wherein the method further comprises coupling a smart streetlight controller to the power tap.

Example B-3 may include the subject matter of any of Examples B-1 to B-2, and alternatively or additionally any other example herein, wherein the method further comprises electrically coupling a first utility-grade power metering circuit to the first male connector; electrically coupling a second utility-grade power metering circuit to the output power interface; and collecting line-side and load-side power consumption information with, respectively, the first and second utility-grade power metering circuits.

Example B-4 may include the subject matter of any of Examples B-1 to B-3, and alternatively or additionally any other example herein, wherein the method further comprises coupling a smart streetlight controller to the power tap; and communicating the line-side and load-side power consumption information to the smart streetlight controller.

Example B-5 may include the subject matter of any of Examples B-1 to B-4, and alternatively or additionally any other example herein, wherein the method further comprises communicating the line-side and load-side power consumption information to a remote computing device.

Example C-1 is a streetlight-based power system, comprising: a plurality of streetlights in a defined geographic area, each of the plurality of streetlights having a respective luminaire, and each of the luminaires having a respective first female connector that is compliant with a roadway area lighting standard promoted by a standards body; a plurality of smart streetlight controllers, each of the plurality of smart streetlight controllers electrically coupled to a respective streetlight luminaire of a different one of the plurality of smart streetlight controllers; two or more power taps electromechanically coupled to a corresponding two or more of the plurality of streetlights, wherein each power tap is positioned between the luminaire of the respective streetlight and the smart streetlight controller of the respective streetlight, each power tap including: a first male connector having at least three pins electromechanically coupling the power tap to the first female connector of the luminaire of the respective streetlight; a second female connector having at least three receptacles receiving at least three corresponding pins of a male connector that is integrated with a respective smart streetlight controller; power conversion circuitry arranged within the power tap to receive a higher voltage input signal and to produce at least one lower voltage output signal; and a power output interface electrically coupled to the power conversion circuitry and exposing the at least one lower voltage output signal.

Example C-2 may include the subject matter of Example C-1, and alternatively or additionally any other example herein, wherein the two or more electronic devices are holiday lighting devices.

Example C-3 may include the subject matter of any of Examples C-1 to C-2, and alternatively or additionally any other example herein, wherein the power conversion circuitry of a certain power tap is powered by a direct current (DC) voltage signal passed from a respective smart streetlight controller.

Example C-4 may include the subject matter of any of Examples C-1 to C-3, and alternatively or additionally any other example herein, wherein each signal of the second female connector of a certain power tap is electrically coupled to a corresponding signal of the first female connector of a respective luminaire.

Example C-5 may include the subject matter of any of Examples C-1 to C-4, and alternatively or additionally any other example herein, wherein the power output interface includes at least two sockets arranged to receive respective plugs of the two or more electronic devices.

The various embodiments described above can be combined to provide further embodiments. Aspects of the embodiments can be modified, if necessary to employ concepts of the various patents, application and publications to provide yet further embodiments.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification but should be construed to include all possible embodiments along with the full scope of equivalents to which such claims are entitled. Accordingly, the claims are not limited by the disclosure.

What is claimed is:

1. An apparatus connectable to a streetlight luminaire, the apparatus comprising:
    a housing having a top surface, a bottom surface, and at least one sidewall interconnecting the top surface and the bottom surface;
    an electrical connector integrated with the bottom surface of the housing, the electrical connector being electromechanically connectable to a top-side electrical connector of the streetlight luminaire;
    power conversion circuitry operable to receive an input alternating current (AC) signal from the electrical connector and produce at least one output AC signal, wherein an average voltage of each output AC signal of the at least one output AC signal is less than an average voltage of the input AC signal; and
    an output power interface electrically coupled to the power conversion circuitry and integrated with the at least one sidewall of the housing, the output power interface being arranged to provide the at least one output AC signal for use external to the housing.

2. The apparatus of claim 1, wherein the electrical connector is compliant with a roadway area lighting standard.

3. The apparatus of claim 1, further comprising:
    at least one interface arranged to pass control signals to the streetlight luminaire.

4. The apparatus of claim 3, wherein the at least one interface is a dimming interface arranged to pass at least one analog dimming signal via at least one pair of electrical contacts.

5. The apparatus of claim 3, wherein the at least one interface passes signals that conform with a digital addressable lighting interface (DALI) protocol.

6. The apparatus of claim 1, further comprising:
    at least one utility-grade power metering circuit; and
    at least one communication circuit arranged to communicate information generated by the at least one utility-grade power metering circuit.

7. The apparatus of claim 6, wherein the at least one utility-grade power metering circuit comprises:
    a line-side power metering circuit; and
    a load-side power metering circuit.

8. The apparatus of claim 6, wherein the information generated by the at least one utility-grade power metering circuit includes power information associated with an incoming power line to the streetlight luminaire.

9. The apparatus of claim 6, wherein the information generated by the at least one utility-grade power metering circuit includes power information associated with at least one of power consumed by the streetlight luminaire and power consumed by a device connected to the output power interface.

10. An apparatus connectable between a streetlight luminaire and an electronic device, the apparatus comprising:
a housing having a top surface, a bottom surface, and at least one sidewall interconnecting the top surface and the bottom surface;
a first electrical connector integrated with the bottom surface of the housing, the first electrical connector being electromechanically connectable to a top-side electrical connector of the streetlight luminaire;
a second electrical connector integrated with the top surface of the housing, the second electrical connector being electromechanically connectable to a bottom-side electrical connector of the electronic device;
power conversion circuitry operable to receive an input alternating current (AC) signal from the first electrical connector and produce at least one output AC signal, wherein an average voltage of each output AC signal of the at least one output AC signal is less than an average voltage of the input AC signal; and
an output power interface electrically coupled to the power conversion circuitry and integrated with the at least one sidewall of the housing, the output power interface being arranged to provide the at least one output AC signal for use external to the housing.

11. The apparatus of claim 10, wherein at least some of the power conversion circuitry receives direct current (DC) power from the electronic device.

12. The apparatus of claim 10, wherein the output power interface includes at least two electric sockets.

13. The apparatus of claim 10, further comprising:
at least one utility-grade power metering circuit; and
at least one communication circuit arranged to communicate information generated by the at least one utility-grade power metering circuit.

14. A method of providing power at a streetlight, the method comprising:
electromechanically coupling a power tap to a first electrical connector located atop a luminaire of the streetlight, the power tap including a housing and a second electrical connector integrated with a bottom surface of the housing, the second electrical connector being couplable to the first electrical connector;
converting, with the power tap, an input alternating current (AC) signal present at the first electrical connector to at least one output AC signal, wherein an average voltage of each output AC signal of the at least one output AC signal is less than an average voltage of the input AC signal; and
providing the at least one output AC signal to an output power interface integrated with a sidewall of the housing to permit use of the at least one output AC signal external to the housing.

15. The method of claim 14, further comprising:
coupling a smart streetlight controller to the power tap.

16. The method of claim 14, further comprising:
electrically coupling a first utility-grade power metering circuit to the first electrical connector;
electrically coupling a second utility-grade power metering circuit to the output power interface; and
collecting line-side and load-side power consumption information using the first utility-grade power metering circuit and the second utility-grade power metering circuit, respectively.

17. The method of claim 16, further comprising:
coupling a smart streetlight controller to the power tap; and
communicating the line-side and load-side power consumption information to the smart streetlight controller.

18. The method of claim 16, further comprising:
communicating the line-side and load-side power consumption information to a remote computing device.

19. A streetlight-based power system comprising:
a plurality of streetlights in a defined geographic area, each of the plurality of streetlights having a respective luminaire, each luminaire having a connector integrated atop the luminaire;
a plurality of electronic devices, each of the plurality of electronic devices electrically coupled to a respective one of the plurality of streetlights; and
two or more power taps electromechanically coupled to a corresponding two or more of the plurality of streetlights, wherein each power tap is positioned between the luminaire of the respective streetlight and an electronic device of the plurality of electronic devices, each power tap including:
a housing having a top surface, a bottom surface, and at least one sidewall interconnecting the top surface and the bottom surface;
a first electrical connector integrated with the bottom surface of the housing, the first electrical connector being electromechanically connectable to the connector integrated atop the luminaire of the respective streetlight;
a second electrical connector integrated with the top surface of the housing, the second electrical connector being electromechanically connectable to a bottom-side electrical connector of the electronic device;
power conversion circuitry operable to receive an input alternating current (AC) signal from the first electrical connector and produce at least one output AC signal, wherein an average voltage of each output AC signal of the at least one output AC signal is less than an average voltage of the input AC signal; and
an output power interface electrically coupled to the power conversion circuitry and integrated with the at least one sidewall of the housing, the output power interface being arranged to provide the at least one output AC signal for use external to the housing.

20. The streetlight-based power system of claim 19, wherein at least some of the plurality of electronic devices include a smart streetlight controller.

21. An apparatus connectable to a streetlight luminaire, the apparatus comprising:
a housing having a top surface, a bottom surface, and at least one sidewall interconnecting the top surface and the bottom surface;
an electrical connector integrated with the bottom surface of the housing, the electrical connector being electromechanically connectable to a second electrical connector of the streetlight luminaire;
power conversion circuitry operable to receive an input alternating current (AC) signal from the electrical connector and produce at least one output voltage signal, wherein a voltage of each output voltage signal is less than a voltage of the input AC signal; and an output power interface electrically coupled to the power conversion circuitry and integrated with the at least one sidewall of the housing, the output power interface being arranged to provide the at least one output voltage signal for use external to the housing.

22. An apparatus connectable between a streetlight luminaire and an electronic device, the apparatus comprising:

a housing having a top surface, a bottom surface, and at least one sidewall interconnecting the top surface and the bottom surface;

a first electrical connector integrated with the bottom surface of the housing, the first electrical connector being electromechanically connectable to an electrical connector of the streetlight luminaire;

a second electrical connector integrated with the top surface of the housing, the second electrical connector being electromechanically connectable to an electrical connector of the electronic device;

power conversion circuitry operable to receive an input alternating current (AC) signal from the first electrical connector and produce at least one output voltage signal, wherein a voltage of each output voltage signal is less than a voltage of the input AC signal; and an output power interface electrically coupled to the power conversion circuitry and integrated with the at least one sidewall of the housing, the output power interface being arranged to provide the at least one output voltage signal for use external to the housing.

* * * * *